United States Patent
Orlamünder et al.

[19]

[11] Patent Number: 5,927,457
[45] Date of Patent: Jul. 27, 1999

[54] PRESSURE PLATE ARRANGEMENT FOR A MOTOR VEHICLE FRICTION CLUTCH WITH AUTOMATIC WEAR COMPENSATION

[75] Inventors: Andreas Orlamünder, Schweinfurt; Matthias Fischer, Eltingshausen, both of Germany

[73] Assignee: Fichtel & Sachs AG, Schweinfurt, Germany

[21] Appl. No.: 08/880,900

[22] Filed: Jun. 23, 1997

[30] Foreign Application Priority Data

Jun. 24, 1996 [DE] Germany ............ 196 25 107

[51] Int. Cl.$^6$ .................................................. F16D 13/75
[52] U.S. Cl. ................................. 192/70.25; 192/111 A
[58] Field of Search ................... 192/70.25, 111 A

[56] References Cited

U.S. PATENT DOCUMENTS

| | | | |
|---|---|---|---|
| 2,280,355 | 4/1942 | Spase et al. | 192/70.25 X |
| 2,345,244 | 3/1944 | Eason | 192/70.25 |
| 3,752,286 | 8/1973 | Sink | 192/111 A |
| 4,099,604 | 7/1978 | Higgerson | 192/111 A |
| 4,189,043 | 2/1980 | Steinhagen | 192/70.25 X |
| 4,228,883 | 10/1980 | Palmer | 192/111 A |
| 4,445,600 | 5/1984 | Schmidt | 192/70.25 X |
| 4,832,164 | 5/1989 | Flotow | 192/70.25 X |
| 5,029,687 | 7/1991 | Asada et al. | 192/70.25 X |
| 5,090,536 | 2/1992 | Asada | 192/70.25 X |
| 5,251,737 | 10/1993 | Flotow et al. | 192/70.25 X |
| 5,816,379 | 10/1998 | De Briel et al. | 192/70.25 |

FOREIGN PATENT DOCUMENTS

| | | | |
|---|---|---|---|
| 0769632 | 4/1997 | European Pat. Off. | |
| 2739159 | 3/1997 | France. | |
| 2916755 | 11/1979 | Germany. | |
| 1288-396-A1 | 2/1987 | U.S.S.R. | 192/111 A |
| 1333-908-A1 | 8/1987 | U.S.S.R. | 192/111 A |
| 2019957 | 11/1979 | United Kingdom. | |
| 1567019 | 5/1980 | United Kingdom. | |

*Primary Examiner*—Charles A Marmor
*Assistant Examiner*—Scott Lund
*Attorney, Agent, or Firm*—Nils H. Ljungman and Associates

[57] ABSTRACT

A motor vehicle friction clutch with automatic wear compensation has a wear compensation element, which wear compensation element can rotate around a clutch axis. The friction clutch also includes an adjustment device, which adjustment device includes a worm rotatably mounted on a carrier. The wear compensation element is a worm gear that meshes with the worm to advance the wear compensation element along the clutch axis to compensate for wear. Axial play in the direction of the clutch axis is provided between the worm gear and the worm to detect wear of the friction linings.

3 Claims, 15 Drawing Sheets

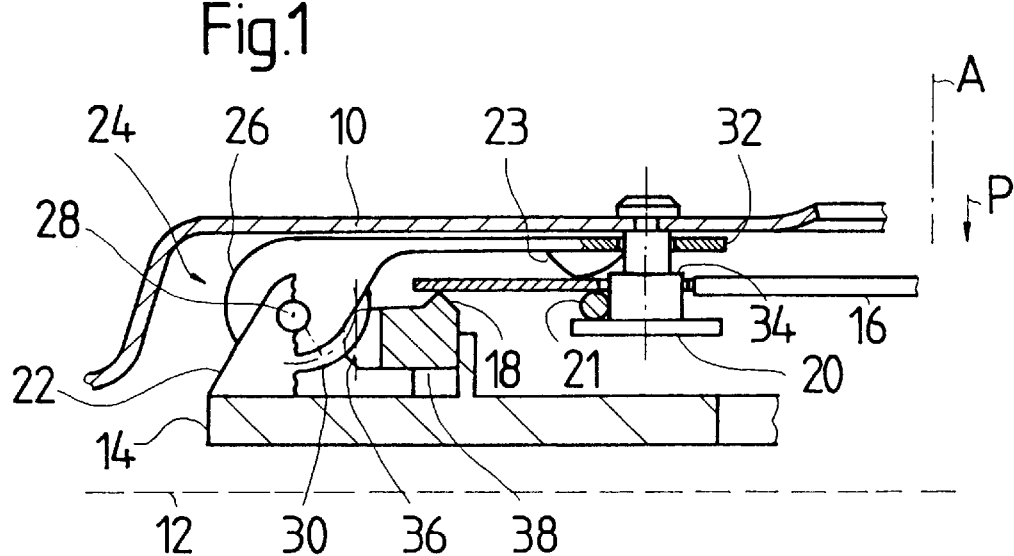
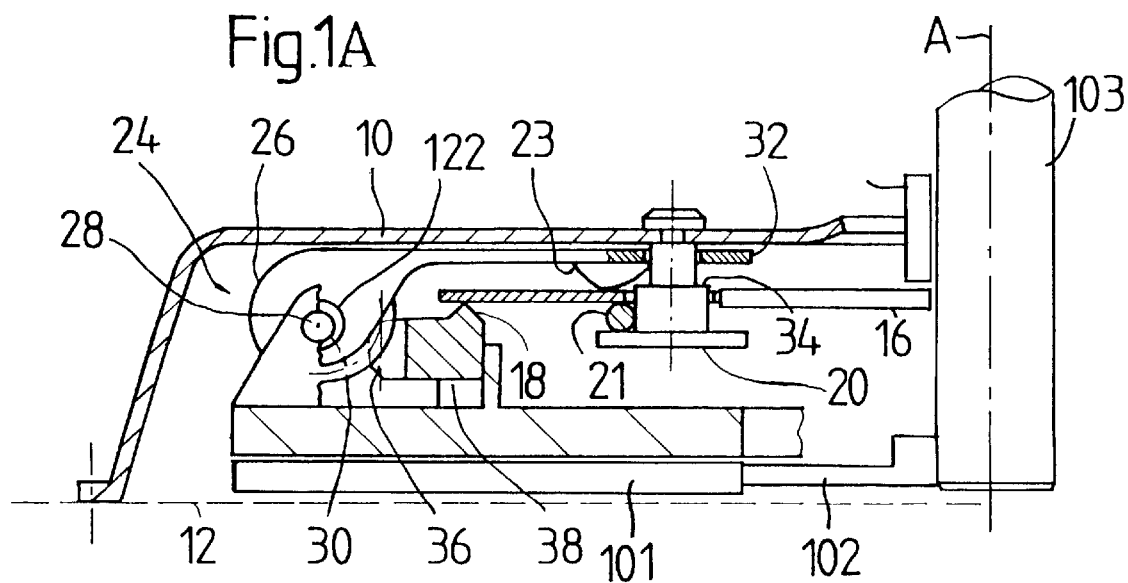

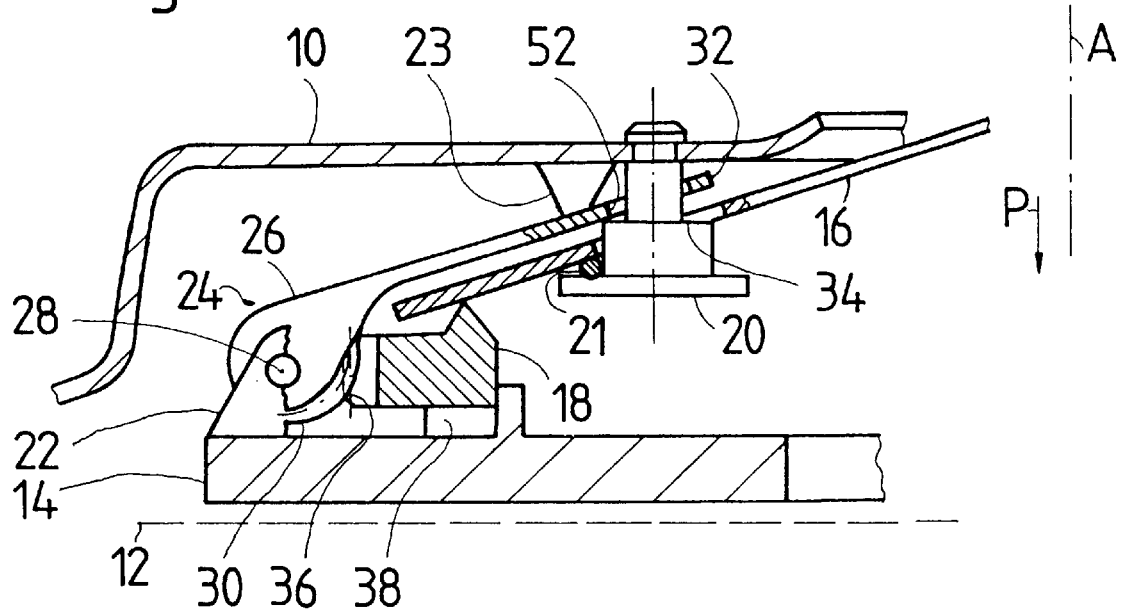
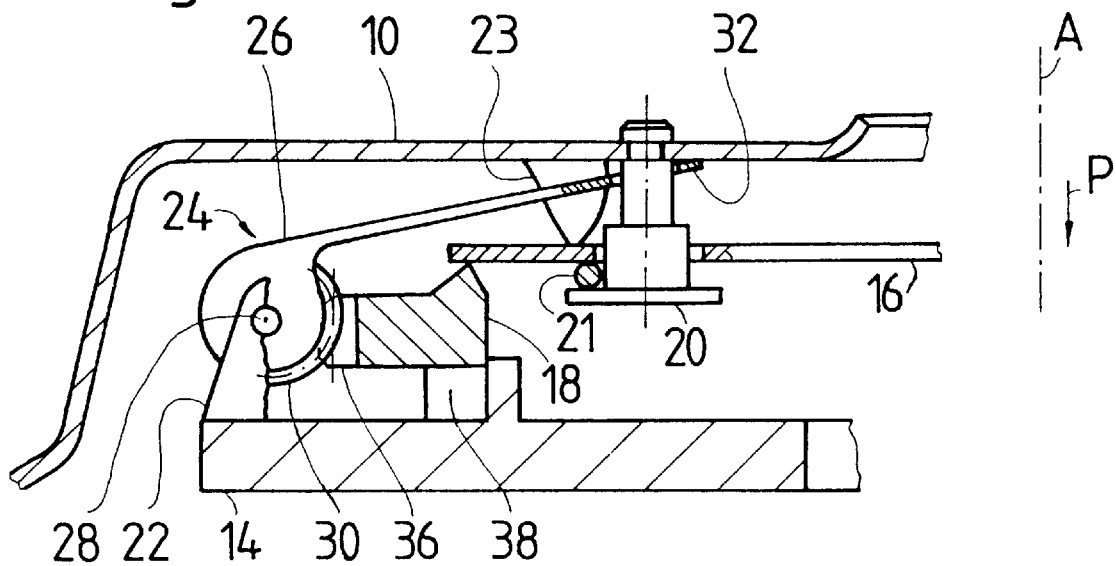

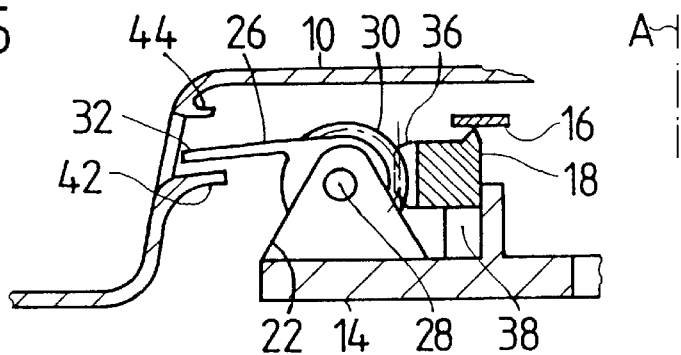
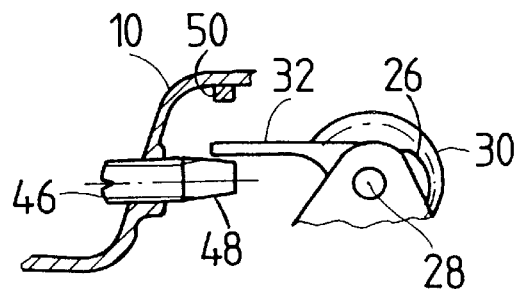
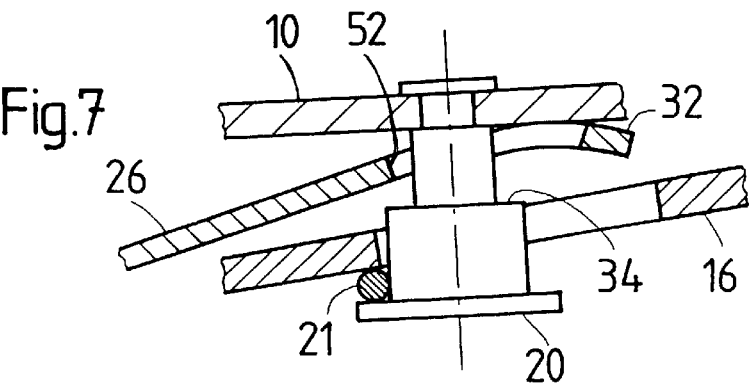
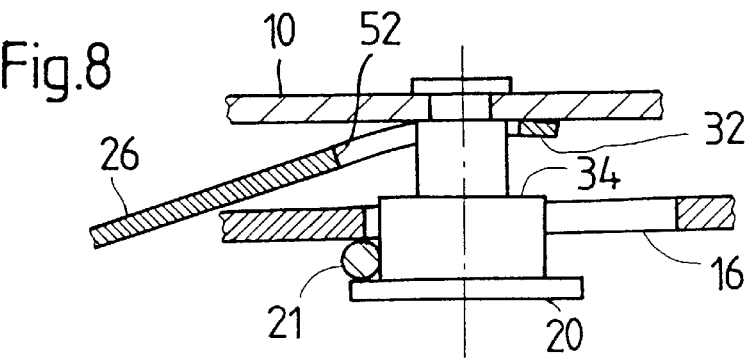

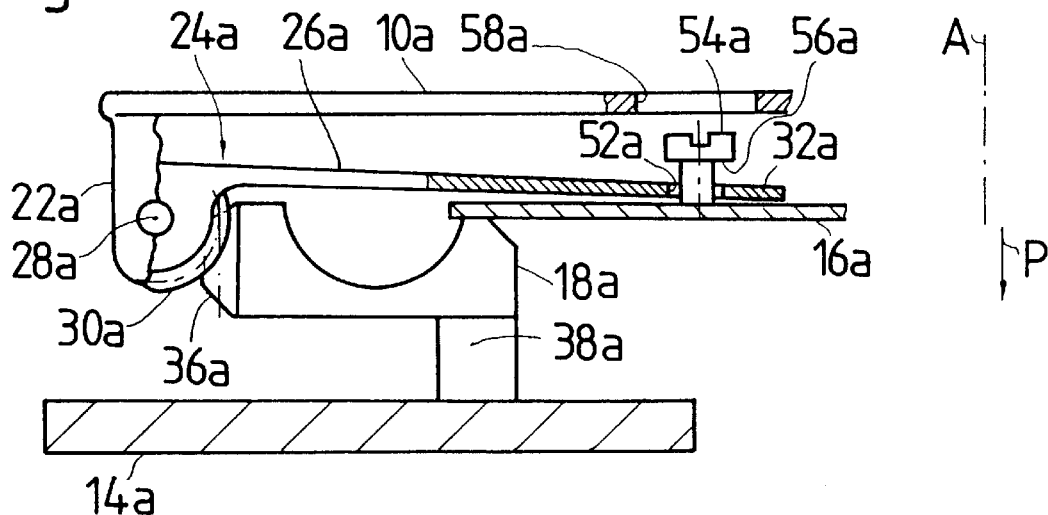
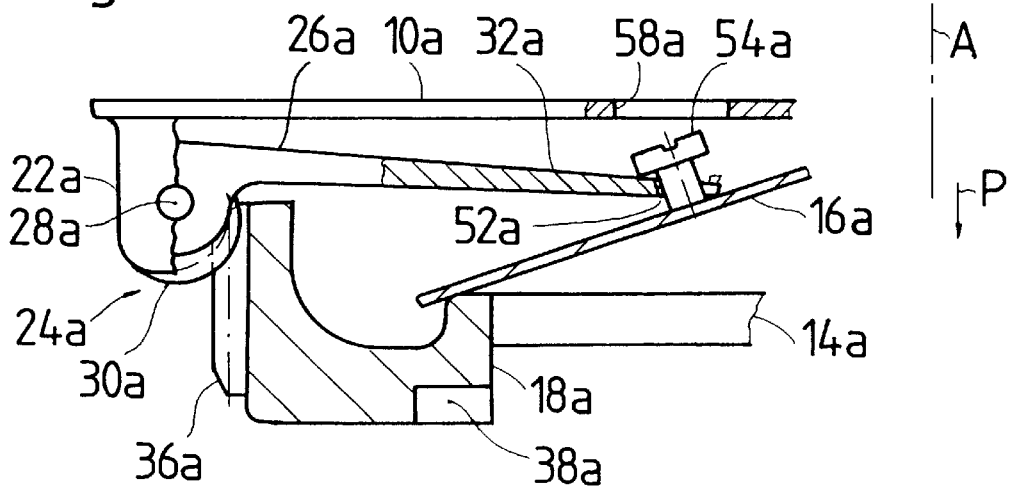

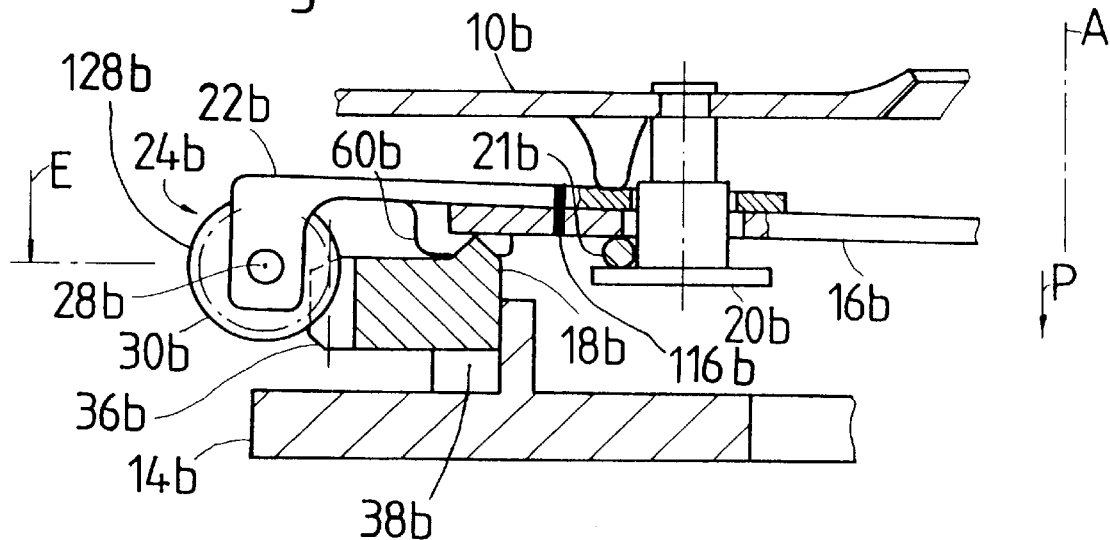
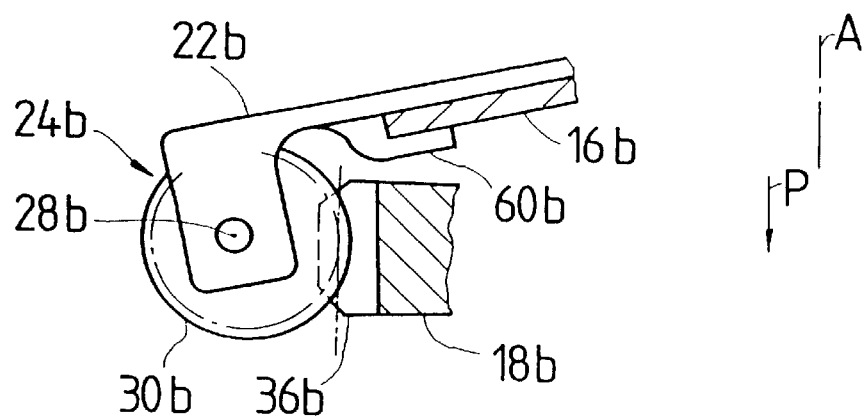

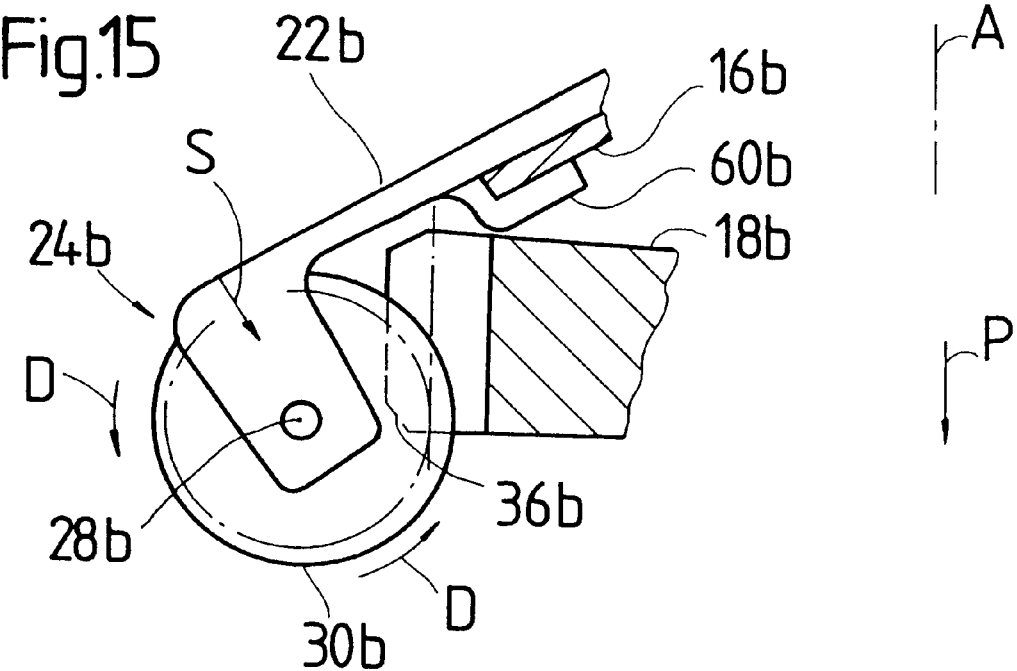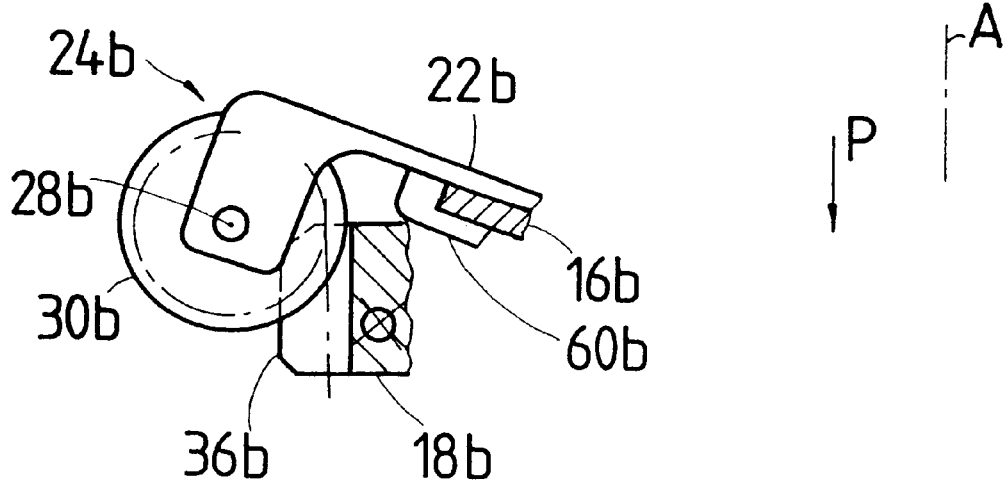

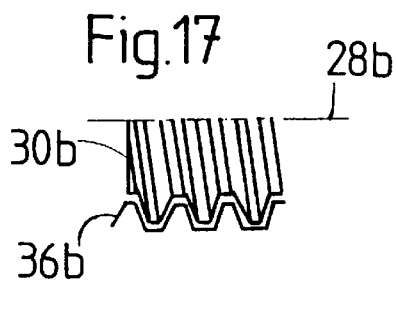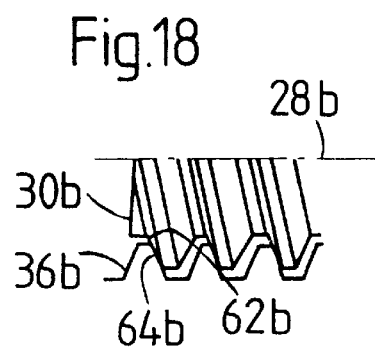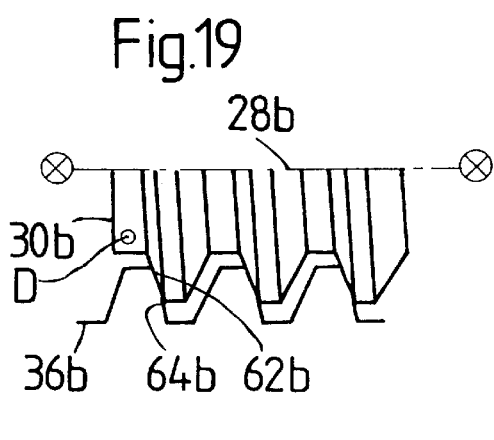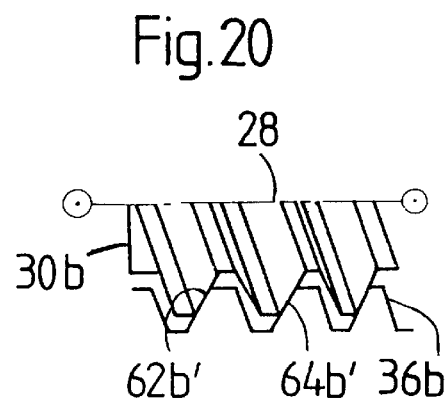

PRESSURE PLATE ARRANGEMENT FOR A MOTOR VEHICLE FRICTION CLUTCH WITH AUTOMATIC WEAR COMPENSATION

BACKGROUND OF THE INVENTION

1. Field of the Invention

The present invention relates generally to a pressure plate arrangement for a motor vehicle friction clutch with automatic wear compensation. The friction clutch can include a clutch housing, which clutch housing can be fastened to a flywheel that can turn around a clutch axis. The friction clutch can also further include a pressure plate, which pressure plate can be arranged in the clutch housing and which pressure plate can be displaced relative to the clutch housing in the direction of the clutch axis. Furthermore, the pressure plate can be supported at the flywheel by friction linings of a clutch disc. The friction clutch can still further include an energy storage device, preferably a membrane spring, which energy storage device can be supported with bias or pre-stress or pre-tension or pre-load between a contact area of the clutch housing and a contact area of the pressure plate. The friction clutch can additionally include a wear tolerance adjustment means with at least one wear compensation element to compensate for wear that occurs during operation, and an adjustment device to operate the wear compensation element.

The wear compensation element can include a ring element that can rotate around the clutch axis and has a toothed wheel work that can be arranged at least on the periphery of the ring element to compensate for wear. The adjustment device can include an axial advance element, which axial advance element can be positioned to rotate on a carrier around an axial advance element axis. The axial advance element can have, on an outer surface thereof, at least one axial advance segment, which at least one axial advance segment can act with the toothed wheel work on the ring element to Venerate an axial advance of the toothed wheel work of the ring element in the direction of the axial advance element axis. A one-way clutch can be assigned to the axial advance element, which clutch can allow for a rotation of the axial advance element in only one direction with respect to the carrier.

2. Background Information

U.S. Pat. No. 4,099,604 discloses a pressure plate arrangement for motor vehicle friction clutches wherein a membrane spring biases the pressure plate against the friction linings of a clutch disc. In a radial outer area, the membrane spring is supported by the clutch housing. Radially inside of the outer point of support, the membrane spring is supported by a wear compensation element. The wear compensation element is connected to and can rotate with the pressure plate through a thread around a clutch axis. By rotating the wear compensation element relative to the pressure plate, the axial extension of the unit formed by the pressure plate and the wear compensation element can be changed, and in particular can be increased, to compensate for wear play that occurs during operation. For this purpose, a worm or screw which combs or engages or threadingly meshes or threadingly engages with the inner circumference toothed wheel work of the wear compensation element is provided on a carrier on the pressure plate, which worm is connected to a lever through a one-way clutch. The lever and the worm are rotatably supported on the carrier, and the other end of the lever is positioned at the clutch release. The clutch release is coupled to the radial inner area of the membrane spring. The lever detects the wear and drives the worm during a subsequent release process through the one-way clutch; upon rotation of the worm, the wear compensation element that combs with the worm is turned around the clutch axis and thus compensates for the wear that has occurred.

In this known pressure plate arrangement, the wear is detected by the lever which is positioned on the one hand on the carrier attached to the pressure plate, and on the other hand on the clutch release which acts with the membrane spring in the radial inner area. However, when wear occurs, the pressure plate with the carrier and the lever positioned on said carrier move toward the clutch axis. Because the membrane spring is also supported by the pressure plate, it moves in its radial inner area, i.e., with the clutch release, also in the same direction as the pressure plate toward the clutch axis when the clutch is engaged. This means that the lever, which is supposed to detect the wear, detects the wear between two structural components which move in the same direction when wear occurs. Even a relatively high degree of wear thus leads to only an insignificant relative motion between the clutch release (which is coupled with the membrane spring) and the pressure plate.

U.S. Pat. No. 2,280,355 discloses a motor vehicle friction clutch wherein the wear compensation element is rotatably attached on the clutch housing by means of an outer thread. A multiple of arms or several arms or a plurality of arms which extend radially outward are provided on the clutch release sleeve. The radially outer areas of the arms bear on the pressure plate, while relative to the bearing point, the arms are positioned with contact radially inward at the wear compensation element. The wear compensation element is forced toward the arms by a coil or helical spring which acts between the clutch release sleeve and the wear compensation element and thus presses the arms against the pressure plate when the clutch is engaged. To compensate for wear that occurs during operation, the wear compensation element housing is rotatably attached to the clutch axis by a thread or threaded connection. An adjustment device includes a lever element connected to an adjustment toothed wheel work through a one-way clutch, and the lever element is positioned with contact on a radial inner segment of the clutch release. When wear occurs, the clutch release moves away from the pressure plate and thus leads to a displacement or swing or sweep of the lever element with respect to the toothed wheel work. In the subsequent clutch release process, the clutch release sleeve of this pressed clutch is pressed toward the pressure plate, whereby the lever element entrains the toothed wheel work through the one-way clutch, to then cause the wear compensation element to rotate around the clutch axis with a corresponding movement toward the pressure plate.

From a publication by Valeo Clutches, "Self Adjusting Technology in a Clutch" by Jacques Thirion de Briel, a pressure plate arrangement for a motor vehicle friction clutch is known wherein an adjustment device is attached to the membrane spring, which adjustment device effects the rotation of a wear compensation element around the clutch axis when wear occurs. To detect the wear, a first wear detection element which acts with a ratchet wheel arranged on the adjustment device is positioned with contact on the housing, while a second element, which second element also acts with the ratchet wheel, is positioned with contact on the membrane spring. When wear occurs, the membrane spring is displaced in axial direction relative to the housing, and the detection element positioned with contact on the housing moves correspondingly relative to the ratchet wheel. This leads to a torsion of the ratchet wheel, which is coupled with a worm. The worm combs or meshes or threadingly engages with teeth arranged at an outer circumference of the wear adjustment element, and causes the wear compensation element to rotate around the clutch axis and thus correspondingly adjusts the wear tolerance during a subsequent release of the clutch.

To detect the wear tolerance that occurs during operation, all of these known pressure plate arrangements for motor vehicle friction clutches require an assembly that is separate from the adjustment device, such as, for example, movably arranged levers, or detection elements which are affixed to or mounted on the housing and act with the corresponding wheels of an adjustment device. This requires an increased number of components in these known pressure plate arrangements, and a correspondingly higher assembling process.

Another pressure plate arrangement for a motor vehicle friction clutch with automatic wear compensation is known from German Patent Document DE-C 29 16 755, corresponding to U.S. Pat. No. 4,228,883, wherein the membrane spring engages in a radial outer area at a wear compensation element arranged on the pressure plate, and is supported in a more radially inward area on the housing. The wear compensation element is supported on the one hand by several slant surfaces arranged in the direction of the circumference on the wear compensation element, and on the other hand on the pressure plate by the pressure plate. An adjustment device is arranged on the housing radially outside the membrane spring and comprises a worm which combs with a toothed wheel work at the wear compensation element. The worm is coupled to an operation or actuating or control disc by a one-way clutch. The operation disc has on the periphery a notch where a radial outer segment of the membrane spring engages.

When wear occurs, the pressure plate and the wear compensation element move toward the pressure plate in the direction of the clutch axis, which leads to a sweeping motion or displacement of the membrane spring and a corresponding catch of the disk element. During the subsequent release of the clutch, the sweeping motion of the membrane spring leads in the opposite direction to catch the disk element, whereby the disk element is then non-rotationally coupled with the worm due to the one-way clutch and thus causes a rotation of the worm, which rotation is transferred to the wear adjustment element. The wear adjustment element then rotates relative to the pressure plate and thus adjusts the wear tolerance through the slant surfaces which act between the wear adjustment element and the pressure plate.

Because of the specific arrangement, this known pressure plate arrangement creates the problem that the membrane spring must be designed in such a manner that it extends to the radial outer area where the adjustment device and the disk element are arranged. This means that the membrane spring has a radial extension or span which corresponds to nearly the entire radial extension of the clutch housing. Thus, special membrane springs which can ensure sufficient pressure force of the pressure plate against the friction linings of the clutch disc even across such a great radial extension, are required for the production of a clutch of this type. In addition, a large volume area in the clutch housing cannot be used for other components because of the very great radial extension of the membrane spring.

OBJECT OF THE INVENTION

The object of the present invention is to provide a pressure plate arrangement for a motor vehicle friction clutch with automatic wear adjustment that requires a smaller number of components and a more simplified assembly process. It is a further object of the present invention to provide a pressure plate arrangement for a motor vehicle friction clutch with automatic wear adjustment that permits use of an energy storage device having a smaller outside diameter. It is yet another object of the present invention to provide a pressure plate arrangement for a motor vehicle friction clutch with automatic wear adjustment that includes a wear detection arrangement to detect the wear between the pressure plate and a structural component that does not move in the direction of the pressure plate when wear occurs, to more precisely detect the actual displacement of the pressure plate relative to the housing when wear occurs and initiate the corresponding wear compensation.

SUMMARY OF THE INVENTION

Thus, the present invention offers a means of providing a pressure plate arrangement for a motor vehicle friction clutch with automatic wear adjustment that requires a smaller number of components and a more simplified assembly process. This object of the present invention can be attained through a pressure plate arrangement for a motor vehicle friction clutch with automatic wear compensation, which pressure plate arrangement can include: a clutch housing which can be fastened to a flywheel that can turn around a clutch axis, a pressure plate which can be arranged in the clutch housing, and which pressure plate can be displaced relative to the clutch housing in the direction of the clutch axis and can be supported at the flywheel by the friction linings of a clutch disc, an energy storage device, preferably a membrane spring, which energy storage device can be supported with bias or pre-stress or pre-tension or pre-load between a contact area of the clutch housing and a contact area of the pressure plate, a wear tolerance adjustment with at least one wear compensation element to compensate for wear that occurs during operation, and an adjustment device to operate the wear compensation element.

The wear compensation element can include a ring element. The ring element can rotate around the clutch axis, and can have a toothed wheel work that is preferably arranged at least on the periphery of the ring element to compensate for wear. The adjustment device can include an axial advance element, which axial advance element can be positioned to rotate around an axial advance element axis on a carrier. The axial advance element can have on an outer surface at least one axial advance segment, which at least one axial advance element can act with the toothed wheel work on the ring element to generate an axial advance of the toothed wheel work of the ring element in the direction of the axial advance element axis. A one-way clutch can be assigned to the axial advance element, which clutch can allow for a rotation of the axial advance element in only one direction with respect to the carrier. To detect the wear, a movement play or a motion tolerance or a movement allowance or a movement tolerance can be provided between the toothed wheel work on the ring element and the axial advance segment of the axial advance element in the direction of the clutch axis.

To detect the wear experienced during operation, in a possible embodiment of the present invention, the pressure plate can require no additional components besides the wear compensation element and the adjustment device, which wear compensation element and adjustment device can be required anyway. In another possible embodiment of the present invention, the toothed wheel work on the ring element and the axial advance element can be matched to one another in such a manner that the mere relative motion between these two units toward the clutch axis is sufficient to detect the wear that occurs during operation.

According to another possible embodiment of the present invention, the energy storage device can preferably be a membrane spring, and the carrier can be arranged on the membrane spring.

In this way, the toothed wheel work on the ring element can be provided preferably as a spiral gearing arranged in an outer circumference area of the ring element.

To provide a suitable force effect of the axial advance segment upon the toothed wheel work on the ring element, so that the toothed wheel work, which acts with the axial advance element, can make a corresponding axial movement when the axial advance element is rotated, the axial advance segment can have an axial advance surface that is preferably sloped relative to the axial advance element axis.

In this way, the axial advance segment can be advantageously formed or constructed or designed or made or built or devised by at least one worm segment which is preferably formed at an outer circumference surface of the axial advance element.

In another possible embodiment of the present invention, the movement allowance between the axial advance element and the toothed wheel work on the ring element can be calculated in such a manner that the axial advance element can be moved in a predetermined movement area toward the clutch axis with respect to the ring element without generating a mutual or corresponding or equivalent force effect between the axial advance element and the toothed wheel work on the ring element. Thus, a movement area can be provided between the ring element and the axial advance element, where preferably there is essentially no mutual force effect when the clutch is in normal operating condition. In doing so, the predetermined movement area can advantageously be a movement area of the axial advance element relative to the ring element in the direction of the clutch axis, in which area the axial advance element can be moved relative to the ring element during the engagement or release of the motor vehicle friction clutch in a condition where no wear occurs.

If, for example, wear occurs subsequently during operation, a relative motion between the axial advance element and the ring element in direction of the clutch axis with simultaneous force effect by the ring element on the axial advance element can be generated when the motor vehicle friction clutch is engaged. The one-way clutch can allow a rotation of the axial advance element around the axial advance element axis.

During a subsequent clutch release process, the axial advance element can move substantially freely toward the clutch axis because the predetermined movement area can preferably be provided relative to the ring element. After the predetermined movement area has been passed through, the axial advance element can generate a torque impact on the ring element. The one-way clutch can prevent the axial advance element from rotating around the axial advance element axis, to generate an axial advance of the toothed wheel work of the ring element which combs with the axial advance element toward the axial advance element axis.

The present invention further discloses a friction clutch having a pressure plate arrangement with an energy storage device, the energy storage device having a smaller outside diameter.

Therefore, according to a second aspect of the present invention, a pressure plate arrangement for a motor vehicle friction clutch with automatic wear compensation can be provided, which friction clutch can include: a clutch housing which can be fastened to a flywheel that can turn around a clutch axis, a pressure plate which can be arranged in the clutch housing, which pressure plate can be displaced relative to the clutch housing in the direction of the clutch axis, and which pressure plate can be supported at the flywheel by the friction linings of a clutch disc, a membrane spring which can be supported with bias or pre-stress or pre-tension or pre-load between a contact area of the clutch housing and a contact area of the pressure plate, wear tolerance adjustment means with at least one wear compensation element to compensate for wear that occurs during operation, and an adjustment device to operate the wear compensation element.

The wear compensation element can include a ring element, which ring element can rotate around the clutch axis to compensate for wear. The ring element can have, at least on its periphery, a toothed wheel work. The adjustment device can include an axial advance element positioned to rotate around an axial advance element axis on a carrier, which axial advance element can have on an outer surface at least one axial advance segment. The at least one axial advance segment can act with the toothed wheel work on the ring element to generate an axial advance of the toothed wheel work of the ring element in the direction of the axial advance element axis. The carrier with the axial advance element can be preferably arranged in a radial direction outside of an outer circumference area.

On the carrier, a wear detection lever can be pivotally entrained around the axial advance element axis. The wear detection lever can be coupled to the axial advance element by a one-way clutch, and a free end of the wear detection lever can be brought to bear on a first or second stop to detect and compensate for the wear. The first and the second stop can be spaced relative to each other in the direction of the clutch axis.

Although the carrier and the axial advance element can be arranged in a radial direction outside an outer circumference of the membrane spring in the pressure plate arrangement in accordance with a possible embodiment of the present invention, it is not necessary to design the membrane spring so large that the membrane spring reaches radially to the axial advance element, because a wear detection lever can be provided. Thus, it can be possible to use membrane springs with a relatively significantly smaller diameter, which leads to substantially more favorable power ratios. Such relatively small membrane springs can be supported on the one hand on a radial inner area of the pressure plate, and on the other hand on the housing.

In addition, using the lever for the detection of wear can permit relatively more design options for the attachment of the first and second stops. Depending on the specific design of the clutch, these stops can then be provided on the one hand, where they permit a safe and dependable detection of the wear, but on the other hand where they do not interfere with other components.

For example, the carrier could be provided arranged on the pressure plate.

The membrane spring can be held on the housing by a multiple or plurality of spring hanger pins and the free end of the wear detection lever can extend between a stop shoulder formed by at least one of the spring hanger pins and the housing.

In accordance with a possible embodiment of the present invention, the stop shoulder on the spring hanger pin can preferably form the first stop and the housing preferably can form the second stop. The already present structural components can act with the wear detection lever and can thus simplify the construction of the pressure plate assembly as compared to known pressure plate assemblies.

To ensure a relatively secure interaction between the wear detection lever and the spring hanger pin, a relatively long hole in the free-end of the wear detection lever can be provided. The long hole can be interspersed by the spring hanger pin, or in other words, the spring hanger pin can penetrate or pass through the long hole.

Because there can be an increasing change of position between the free end of the carrier's pivotally arranged wear detection lever, which carrier can be arranged on the pressure plate, and the housing or the spring hanger pin, when wear occurs and the pressure plate moves accordingly toward the clutch axis even after compensating for the wear, in a possible embodiment of the present invention, the free end of the wear detection lever can be bent away from or curved away from the housing. Such a bend or curvature can provide a nearly constant position of the free end of the wear detection lever relative to the housing or the spring hanger pin at essentially all times, essentially independent of the position of the pressure plate because of wear.

Advantageously, it can be provided in a possible embodiment of the present invention, that the first stop and/or the second stop can be adjustable to set the spacing between the first and the second stop in the direction of the clutch axis and/or to set the position of the first stop and/or the second stop relative to the free end of the wear detection lever. In this way, for example, readjustments or an adjustment or setting to a specific type of clutch can be performed after the pressure plate arrangement or the motor vehicle friction clutch has already been assembled.

It can be provided that the first stop and/or the second stop be preferably formed by a tapering end segment of a pin element movably attached on the housing essentially perpendicular to the direction of the clutch axis. Alternatively or additionally, it can be provided that the first stop and/or the second stop can be designed integrally with the housing.

According to another embodiment of the present invention, the carrier can be arranged on the housing. In such an embodiment, it can be provided that a pin element with a radial projection be preferably arranged on the membrane spring, and that the free end of the wear detection lever can extend between the radial projection on the pin element and the membrane spring.

Advantageously, the radial projection on the pin element can form the first stop and the membrane spring can form the second stop.

However, to achieve an even more dependable interaction between the wear detection lever and the pin element, it is proposed that a relatively long hole can be provided in the free end area of the wear detection lever, which long hole can be interspersed or can be penetrated by the pin element. To adjust or substantially match certain structural components, the pin element can again be movably arranged in the direction of the clutch axis on the membrane spring to adjust the spacing between the first stop and the second stop.

Alternatively, it can be possible, in another embodiment of the present invention, to arrange a pin element on the pressure plate, which pin element preferably extends through a through-opening of the membrane spring in the direction of the clutch axis. The free end of the wear detection lever preferably extends between a radial projection formed on the pin element and the membrane spring, whereby the radial projection on the pin element can form the first stop and the membrane spring can form the second stop.

The toothed wheel work on the ring element can be a spiral gearing preferably arranged on the outer circumference area of the ring element. The axial advance segment preferably has a sloped axial advance surface relative to the axial advance element to generate an axial movement of the toothed wheel work relative to the axial advance element.

For example, it can be provided that the axial advance segment be formed by at least one worm segment designed on the outer circumference area of the axial advance element.

The present invention furthermore relates to a pressure plate arrangement for a motor vehicle friction clutch with automatic wear compensation, including a clutch housing which can be fastened to a flywheel that can turn around a clutch axis, a pressure plate which can be arranged in the clutch housing and can be displaced relative to the clutch housing in the direction of the clutch axis and can be supported at the flywheel by the friction linings of a clutch disc, an energy storage device, preferably a membrane spring, which energy storage device can be supported with bias or pre-stress or pre-tension or pre-load between a contact area of the clutch housing and a contact area of the pressure plate, a wear tolerance adjustment means with at least one wear compensation element to compensate for wear that occurs during operation, and an adjustment device to operate the wear compensation element. The wear compensation element can include a ring element. The ring element can rotate around the clutch axis and can have a toothed wheel work arranged at least on the periphery of the ring element to compensate for wear. The adjustment device can include an axial advance element, which axial advance element can be positioned on a carrier and can rotate around an axial advance element axis. The axial advance element can have, on an outer surface, at least one axial advance segment, which at least one axial advance segment can act with the toothed wheel work on the ring element to generate an axial advance of the toothed wheel work of the ring element in the direction of the axial advance element axis. The pressure plate arrangement can also include wear detection means or a wear detection apparatus or an arrangement to detect wear to detect wear of the friction linings and generate a corresponding wear adjustment with an at least one wear compensation element.

Such a pressure plate arrangement is known, for example, from the previously cited U.S. Pat. No. 4,099,604.

In accordance with the present invention, it is therefore proposed that the wear detection means preferably detect the wear between the pressure plate and a structural component which cannot be displaced relative to the clutch housing when wear occurs. Consequently, the wear detection means can relatively precisely detect the actual displacement of the pressure plate relative to the housing when wear occurs, and can initiate or create or effect or produce or generate the corresponding wear compensation.

In this way, the wear detection means can preferably include a wear detection lever. The wear detection lever can be pivotally entrained around the axial advance element axis and can be coupled to the axial advance element by a one-way clutch, whereby the free end of the wear detection lever for the detection of the wear and the compensation of the wear can be brought to bear or can be positioned at a first or second stop. The first stop and the second stop can be spaced in the direction of the clutch axis, and can be stationary relative to the clutch housing.

In another embodiment of the present invention, it is possible for the wear detection means to detect the wear between the pressure plate and a structural component that cannot be moved in the direction of the pressure plate when wear occurs. This means, for example, that the wear detection lever can detect the wear between the pressure plate and a structural component which can be moved in the opposite direction of the pressure plate when wear occurs. This structural component, for example, can be the membrane spring in a segment which displaces into the opposite direction of the movement of the pressure plate when wear occurs and there is a corresponding displacement of the membrane spring.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is described in more detail below, with references to the enclosed drawings, in which:

FIG. 1 is a partial longitudinal view of a first embodiment of a pressure plate arrangement according to the invention where the clutch is released;

FIG. 1A is a partial longitudinal view of another embodiment of a pressure plate arrangement according to the invention;

FIG. 3 illustrates the pressure plate arrangement of FIG. 1 in a clutch-in position when wear occurs;

FIG. 4 illustrates the pressure plate arrangement of FIG. 1 in a released position after the occurrence of wear;

FIG. 5 illustrates an alternate embodiment of the pressure plate arrangement of FIG. 1;

FIG. 6 illustrates another alternate embodiment of the pressure plate arrangement of FIG. 1;

FIG. 7 is an enlarged view of the free end of the wear detection lever in a position where no wear is present;

FIG. 8 is a view corresponding to FIG. 7 in a condition where wear is present;

FIG. 9 is a partial longitudinal cross-section view of a pressure plate arrangement according to the invention according to a second embodiment, where the carrier is arranged on the clutch housing, in a released position without wear;

FIG. 10 is a view corresponding to FIG. 9, in a clutched-in position, without wear;

FIG. 13A is a partial longitudinal cross-section view through a pressure plate arrangement according to a possible embodiment of the present invention;

FIG. 14 is a view corresponding to FIG. 13, in a clutched-in position, without wear;

FIG. 15 is a view corresponding to FIG. 14 at the occurrence of wear;

FIG. 16 is a view corresponding to FIG. 13 after the occurrence of wear;

FIGS. 17 to 20 illustrate respective cross-sections in a plane E of FIG. 13, which schematically illustrate the worm that acts together or cooperates with the toothed wheel work on the wear adjustment element during the various movements or wear conditions;

DESCRIPTION OF THE PREFERRED EMBODIMENT

Figure 2:
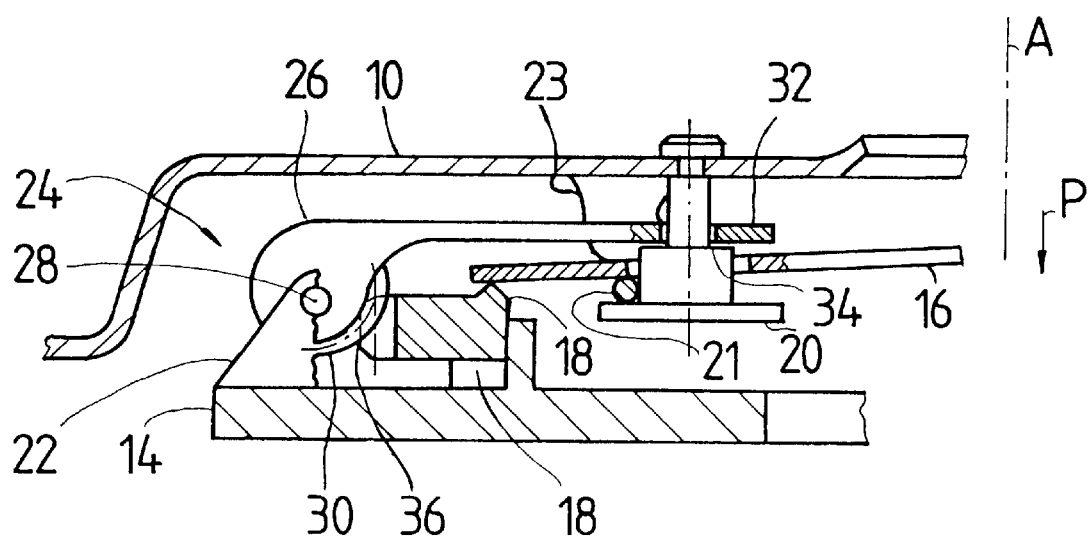
FIG. 2 illustrates the pressure plate arrangement of FIG. 1 in a clutch-in position.

FIGS. 1 to 8 show a first embodiment of a pressure plate arrangement for a motor vehicle friction clutch according to the present invention. As shown in FIG. 1, the pressure plate arrangement can include a clutch housing 10 attached or fastened or affixed in a radial outer area of a flywheel 12 (shown only schematically) of the clutch. In the clutch housing 10, a pressure plate 14 can be arranged to be displaced substantially in the direction of a clutch axis A. The pressure plate 14 can be forced or pressed or pushed toward the flywheel 12 by a membrane spring 16. In this way, the membrane spring 16 can be positioned in a radial outer area on a cutting ring 18, and the membrane spring 16 can be carried in a more inward radial area at the clutch housing 10 by a multiple or plurality of spring hanger pins 20, which spring hanger pins 20 can be distributed around the clutch axis A. The clutch shown in FIG. 1 is that of a pressed or pushed type, and in the engaged position, the membrane spring 16 can rest on support projections 23. The support projections 23 can extend inward from the clutch housing 10, to press the pressure plate 14 through the cutting ring 18 toward the flywheel 12. To release the clutch, the membrane spring 16 can be displaced in a radial inner area in the direction of an arrow P and can be supported by a wire ring 21 on the spring hanger pins 20.

Also attached to pressure plate 14 can be a carrier 22, which carrier 22 can carry an adjustment device 24; the adjustment device 24 and the cutting ring 18, which cutting ring 18 preferably acts as a wear compensation element, can compensate for the wear experienced during operation of the clutch, as is described in more detail below. The adjustment device 24 can include a wear detection lever 26, which wear detection lever 26 can be pivotally supported around an axial advance element axis 28 at the carrier 22. In the embodiment shown in FIG. 1, the axial advance element axis 28 is preferably substantially perpendicular to the drawing plane. The carrier 22 can also carry a worm 30, which worm 30 can rotate around the axial advance element axis 28. The worm 30 preferably can serve as the axial advance element 30. The worm 30 can be coupled to the wear detection lever 26 by a one-way clutch 122 (see FIG. 1A) in such a manner that the worm 30 can be rotated around the axial advance element axis 28 in only one direction relative to the wear detection lever 26.

The wear detection lever 26 can extend from the carrier 22 radially inward and the free end 32 of the wear detection lever 26 can be located in the area of the spring hanger pin 20 between the clutch housing 10 and a stop shoulder 34 preferably formed on the spring hanger pin 20. The wear detection lever 26 can have a relatively long hole or slot on its free end 32, which long hole or slot can be interspersed or penetrated by the spring hanger pin 20.

A toothed wheel work 36 can be provided on an outer circumference area of the cutting ring 18, which toothed wheel work 36 preferably combs or meshes with the worm 30. Also arranged at the cutting ring 18 and the pressure plate 14 are respectively opposed sloped surfaces 38. The sloped surfaces 38 can extend around the clutch axis A in the direction of the periphery in a known manner, so that a relative turn or rotation or angular displacement of the cutting ring 18 around the clutch axis A relative to the pressure plate 14 can effect a movement of the cutting ring 18 toward the clutch axis A relative to the pressure plate 14.

Figure 30:
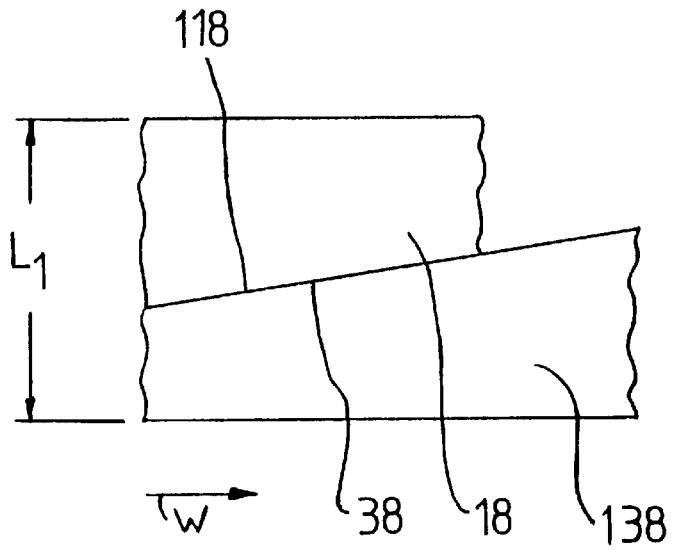
FIGS. 30–31 are schematic partial views of a possible embodiment of the present invention.
Figure 31:
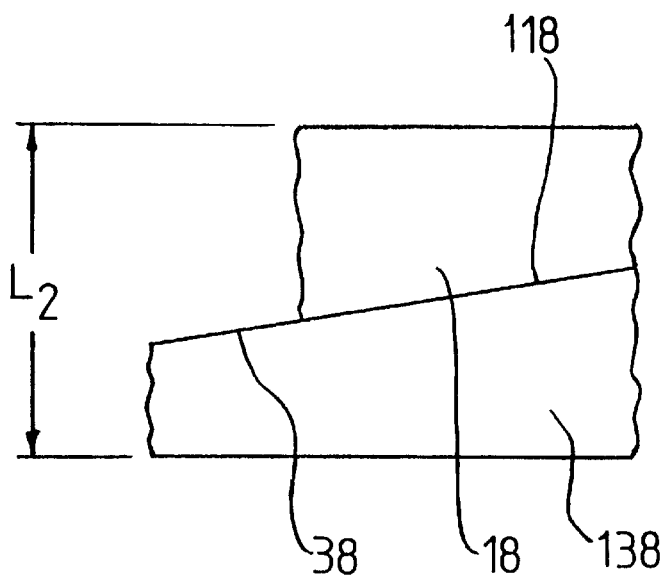

In other words, for a possible embodiment, FIGS. 30 and 31 illustrate partial views of a possible embodiment of the cutting ring 18 and one of the sloped surfaces 38. The sloped surface 38 can be a surface 38 of a separate component 138, or the surface 38 can be a portion of the pressure plate 14. The cutting ring 18 can have a sloped surface 118 to cooperate with the sloped surface 38 to compensate for wear. It should be understood that each of the cutting ring 18 and the component 138 can have one or more cooperating surfaces 118 and 38 distributed about the clutch axis A. For clarity, only one cooperating pair 38, 118 is illustrated in FIGS. 30 and 31.

As shown in FIG. 30, the cutting ring 18 and the component 138 can have together an axial dimension $L_1$ extending preferably substantially parallel to the clutch axis A. Upon rotation of the cutting ring 18 with respect to the component 138 in the circumferential direction W about the clutch axis A, the cutting ring 18 and the component 138 can be positioned as shown in FIG. 31. The axial dimension $L_1$ shown in FIG. 30 can now be increased to the axial dimension $L_2$ to compensate for wear of friction linings 101 (see FIG. 1A). In other possible embodiments of the present invention, the relative rotation of the cutting ring 18 with respect to the component 138 can be in the direction opposite to that of the direction W to effect a decrease in the axial dimension $L_1$ to compensate for wear of the friction linings 101.

FIG. 1A schematically illustrates, for a possible embodiment of the present invention, the relationship between one or more friction linings 101 carried on a clutch disc 102. The pressure plate 14 can be configured to engage and disengage the friction linings 101 against the flywheel 12 of a motor vehicle. The clutch axis A can be a longitudinal axis A of the friction clutch, and the longitudinal axis A can correspond to a longitudinal axis of a transmission input shaft or transmission input member 103 of a motor vehicle. The clutch housing 10 can be configured to be attached to the flywheel 12 for rotation of the clutch housing 10 about the longitudinal axis A. A clutch actuator mechanism 104 (shown schematically) can displace the ends of the membrane spring 16 to engage and disengage the friction clutch. Because the flywheel 12, friction linings 101, clutch disc 102, transmission shaft 103 and clutch actuator mechanism 104 are known, detailed descriptions thereof are omitted herein.

The following particularly describes the function of the pressure plate arrangement according to the first embodiment for automatic wear compensation with respect to FIGS. 1 to 4. FIG. 1 shows the clutch constructed with the pressure plate arrangement of the first embodiment in a released position, where the radial inner area of the membrane spring 16 can be pressed in the direction of arrow P so that the radial outer area of the membrane spring 16 sweeps in an opposite direction of the arrow P and the pressure plate 14 with the cutting ring 18 and the carrier 22 can move in an opposite direction of the arrow P when the membrane spring 16 yields or deforms. In this position, where there is in effect not yet any wear of the friction linings 101, for example of the clutch disc 102 (shown schematically in FIG. 1A), the free end 32 of the wear adjustment lever 26 is preferably not positioned on the housing 10 when the wear adjustment lever 26 is in the released position.

When the clutch is subsequently engaged (shown in FIG. 2), the radial inner area of the membrane spring 16 can move in the opposite direction of the arrow P, and the radial outer area of the membrane spring 16 preferably displaces or sweeps in the direction of the arrow P and can force the pressure plate 14 toward the flywheel 12 in the direction of the arrows P while being supported on the projections 23. In this way, the carrier 22 can also move with the wear compensation lever 26 in the direction of the arrow P; however, the movement play for the free end 32 of the wear compensation lever 26 in the direction of the clutch axis A, which play is preferably formed between the stop shoulder 34 on the spring hanger pin 20 and the housing 10, is calculated so that the free end 32 of the wear compensation lever 26 is not positioned with contact on the stop shoulder 34, which stop shoulder 34 preferably forms a first stop, or on the housing 10, which preferably forms a second stop, when the clutch is engaged or released and there is essentially not yet any wear of the friction linings.

When the friction linings 101 begin to wear during the operation of a pressure plate arrangement or motor vehicle friction clutch constructed in this manner, the pressure plate 14 can move in further or closer towards the flywheel 12 in the direction of the arrow P when the clutch is engaged, as is shown in FIG. 3. In this way, however, the free end 32 of the wear compensation lever 26 can be positioned with contact on the stop shoulder 34 of the spring hanger pin 20, and the wear compensation lever 26 can be swept counter-clockwise around the axial advance element axis 28, as is shown in FIG. 3. The one-way clutch 122 that preferably acts between the wear detection lever 26 and the worm 30 can be designed in such a manner that the one-way clutch 122 can allow a relative turn between the wear detection lever 26 and the worm 30 when the wear detection lever 26 sweeps counter-clockwise, because, especially in the clutched-in position, the cutting ring 18 can be loaded or stressed by the membrane spring 16 and can no longer rotate around the clutch axis A.

If the clutch is subsequently released, as shown in FIG. 4, the radial inner part of the membrane spring 16 can be pressed in the direction of the arrow P, whereby the radial outer part of the membrane spring 16 can be simultaneously swept in the opposite direction of the arrow P so that the pressure plate 14 and the cutting ring 18 can be displaced in the opposite direction of the arrow P and the clutch disc can be released. Because the wear detection lever 26 was swept counter-clockwise in the previous position, where the clutch was engaged with wear (shown in FIG. 3), the free end 32 of the wear detection lever can then be positioned with contact on the housing 10, which housing 10 preferably forms the second stop, when the clutch is released, as is shown in FIG. 4. If the pressure plate 14 continues to move along the clutch axis A in the opposite direction of arrow P, the wear detection lever 26 can then be swept clockwise around the axial advance element axis 28 in FIG. 4 because the free end 32 of the wear detection lever 26 can be positioned with contact on the housing 10.

Because of the one-way clutch 122, the worm 30 is preferably now coupled to rotate with the wear detection lever 26, so that the clockwise sweep of the wear detection lever 26 can lead to the same rotation of the worm 30 around the axial advance element axis 28. This rotation of the worm 30 can then generate a movement of the toothed wheel work 36 of the cutting ring 18, which toothed wheel work or gearing portion 36 preferably combs or toothedly meshes with the worm 30. The rotational movement of the toothed wheel work 36 in the direction of the axial advance element axis 28 can lead to a rotation or turn of the cutting ring 18 around the clutch axis A.

Because the cutting ring 18 is preferably not relatively highly loaded by the membrane spring 16 in FIG. 4, which FIG. 4 shows the clutch in a released condition, this released condition can allow a rotation of the cutting ring 18 relative to the pressure plate 14. During this relative turn, as previously mentioned, the cutting ring 18 can be displaced relative to the pressure plate 14 in the direction of clutch axis A and in the opposite direction to the arrow P because of the sloped surfaces 38, which sloped surfaces 38 can preferably be provided on the cutting ring 18 and the pressure plate 14. Thus, the extension of the unit formed by the pressure plate 14 and the cutting ring 18 can be increased in the direction of the clutch axis A, which extension can preferably compensate for the wear of the friction linings 101 that occurs during operation of the clutch.

When the clutch is subsequently engaged, the total length of the cutting ring 18, the pressure plate 14, and the friction linings 101 formed in the direction of clutch axis A can once again substantially conform to a position where there is no wear of the friction linings 101, so that the membrane spring 16 can essentially return to its original wear position, or in other words, the membrane spring 16 can essentially return to its original position. This essentially ensures that regardless of the amount of wear, the membrane spring 16 can essentially always have the same length or operating positions in engaged and released positions as it does in a position without wear. This can in effect ensure that the membrane spring 16 can essentially always be operated in substantially the same force range so that the engagement or release characteristics of a motor vehicle friction clutch constructed with such a pressure plate arrangement can remain substantially unaffected by wear.

In a construction of this type, the worm 30 can serve as an axial advance element for the toothed wheel work 36 on the cutting ring 18 to axially displace this toothed wheel work 36 relative to the axial advance element axis 28 when the worm 30 rotates.

FIGS. 5 and 6 show alternate embodiments to detect the wear. In the embodiment according to FIG. 5, the wear detection lever 26 can be designed in such a manner that it extends radially outward relative to the carrier 22. However, the wear detection lever 26 can be coupled to the worm 30 by a one-way clutch 122 (see FIG. 1A) in essentially the same way as in the embodiments shown in FIGS. 1 to 4. The free end 32 of the wear detection lever 26 can be positioned between projections 42, 44 formed on the radial outer periphery of the housing 10; the projections 42, 44 can extend radially inward. In this way, the projection 42 can form the first stop and the projection 44 can form the second stop. In particular, the stops or projections 42 and 44 can preferably be built integrally with the housing 10 by bending corresponding tongues which were formed by punch-out or punching or stamping or by deformation of a portion of the clutch housing 10.

As in the embodiments according to FIGS. 1 to 4, a motion of the pressure plate 14 with the carrier 22 in the direction of the flywheel 12 when wear occurs can position the free end 32 of the wear detection lever 26 with contact at the projection 42 and can lead to a corresponding clockwise displacement of the wear detection lever 26. The one-way clutch 122 can be designed in such a manner that it can permit a sweep or rotation or angular displacement of the wear detection lever 26 relative to the worm 30. When the friction clutch is subsequently released, the free end 32 of the wear detection lever 26 can be positioned with contact on the second projection 44 and swept in FIG. 5 counter-clockwise around the axial advance element axis 28. The wear detection lever 26 can entrain the worm 30 due to the coupling effect of the one-way clutch 122 and cause the worm 30 to rotate counter-clockwise with the wear detection lever 26.

This rotation of the worm 30 can then again be transferred to the toothed wheel work 36 on the cutting ring 18, which rotation can lead to a relative rotation of the cutting ring 18 around the clutch axis A relative to the pressure plate 14. Because of the sloped surfaces or ramps or inclined surfaces 38 on the cutting ring 18 and the pressure plate 14, the axial extension of the unit formed by the cutting ring 18 and the pressure plate 14 can again be increased and thus the wear can be compensated for.

In the embodiment according to FIG. 6, the first stop is preferably provided by a stud element 46, which stud element 46 can be formed on a radial outer periphery of the housing 10. The stud element 46 can have preferably a tapering end area 48, where preferably the free end 32 of the wear detection lever 26 can be positioned with contact when wear occurs. Like the projection 44 in the embodiment of FIG. 5, a second stop 50 provided on the housing 10 can be designed to create a counter-clockwise sweeping movement of the wear detection lever 26 in FIG. 6, with a corresponding rotation of the worm 30 when the clutch is released.

In the embodiment according to FIG. 6, the stud 46 can be displaced in the radial direction when the stud 46 is rotated relative to the housing 10, so that a spacing between the truncated cone segment 48 that forms the first stop and the second stop 50 can be generated. In addition, it can be possible to adjust or justify or set or fine-tune the position of the first stop 48 relative to the free end 32 of the wear detection lever 26, preferably by rotating the stud 46. Thus, this type of embodiment can make it possible to perform adjustments after the clutch has been assembled, to obtain a desired wear compensation characteristic. Although not represented in the figures, it can also be possible to form the second stop with an adjustable element of this type. In addition, it is possible to form one of the stops integrally with the housing 10, as shown in FIG. 5, and to form the other stop by using an adjustable element.

FIGS. 7 and 8 show an alternate embodiment of the free end 32 of the wear detection lever 26. Preferably, the free end 32 of the wear detection lever 26 can be bent away or curved away from the housing 10. FIGS. 1 to 4 show that increasing wear can force the position of the pressure plate 14 closer to the flywheel 12. This approach will be compensated by a wear compensation movement of the cutting ring 18 relative to the pressure plate 14, as previously described. However, because the carrier 22 with the wear detection lever 26 is preferably arranged on the pressure plate 14, there can also be an increased displacement or swinging of the wear detection lever 26 relative to the housing 10. To provide an essentially constant positioning characteristic of the wear detection lever 26 on the housing 10, which housing 10 can preferably form the second stop, the wear detection lever 26, as shown in FIGS. 7 and 8, can be bent or curved or shaped in such a manner that its free end 32 can in effect always be positioned with contact on the housing 10 in substantially the same manner, regardless of the arising wear condition.

FIG. 7 shows a position where there is relatively little or no wear, while FIG. 8 shows a position where a relatively high degree of wear has occurred. It is shown that the wear detection lever 26 can move relative to the housing 10 and thus the spring hanger pin 20 in such a manner that the spring hanger pin 20 is preferably increasingly displaced in a relatively long hole or slot or oblong hole or elongated hole 52 in the area of the free end 32 of the wear detection lever 26. However, because the wear detection lever 26 is preferably bent or curved, the positioning characteristic of the wear detection lever 26 on the housing 10 can remain nearly unchanged.

FIGS. 7 and 8 also show that the long hole 52 can also have the additional function to provide, in effect, a relatively safe interaction between the wear detection lever 26 and the first and second stops, because the spring hanger pin 20 can intersperse or penetrate through the slot or long hole 52. Thus an unintentional movement of the free end 32 of the wear detection lever 26 outside the area formed between the first and the second stop can be avoided.

FIGS. 9 to 12 show a second embodiment of the pressure plate for a motor vehicle friction clutch according to the present invention. In FIGS. 9 to 12, structural components which correspond to structural components in FIGS. 1 to 8 have the same reference symbols, with the addition of an "a".

In the embodiment shown in FIGS. 9 to 12, the carrier 22a can be attached to the housing 10a. The wear detection lever 26a can extend radially inward. A pin element 54a can be attached to the membrane spring 16a in such a manner that the pin element 54a can extend from the membrane spring 16a in an opposite direction to the pressure plate 14a. A radial projection 56a can be designed at the pin element 54a, which radial projection 56a can form the first stop for the free end 32a of the wear detection lever 26a. In this embodiment, the second stop is preferably formed by the membrane spring 16a.

FIG. 9 shows the pressure plate arrangement in a released position. The membrane spring 16a in its radial inner area is preferably displaced in the direction of the arrow P, and the membrane spring 16a is preferably moved in its radial outer area in the opposite direction of the arrow P to obtain a corresponding displacement of the pressure plate 14 in the opposite direction of the arrow P.

FIG. 10 shows the clutch in an engaged position, where the radial outer area of the membrane spring 16a preferably moves in the direction of the arrow P when the radial inner area of the membrane spring 16a is released, and the pressure plate 14a is preferably moved toward the flywheel through the cutting ring 18a. The play formed between the first stop, which first stop can be formed by the radial projection 56a (see FIG. 9) of the pin element 54a, and the second stop, which second stop can be formed by the membrane spring 16a, in the direction of the clutch axis A can be calculated in such a manner that in a position where essentially no wear is present in either clutched-in or released condition, the free end 32a of the wear detection lever 26a, which wear detection lever 26a preferably extends between the first and the second stop, can be positioned with contact at one of the stops.

Figure 11:
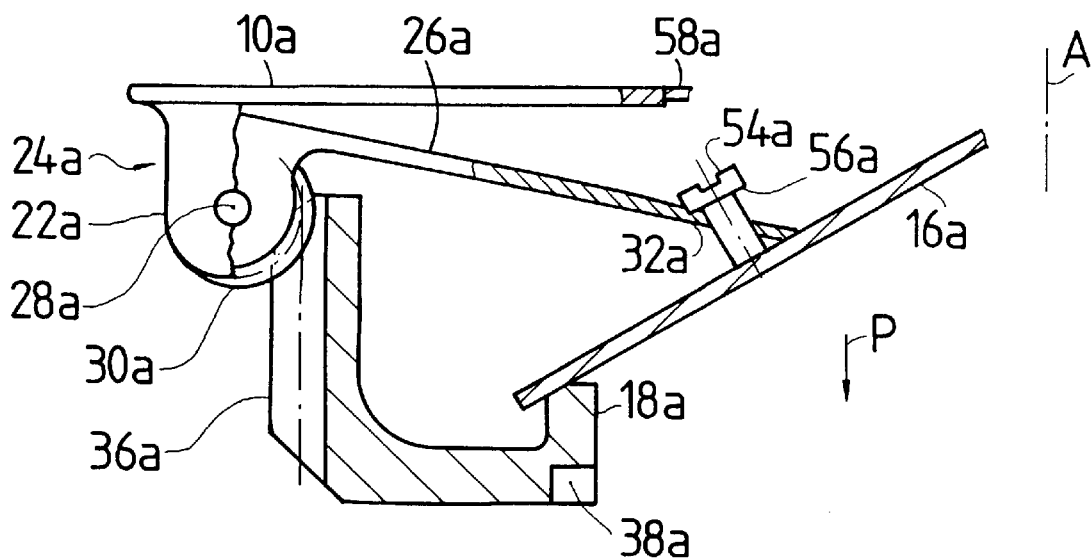
FIG. 11 is a view corresponding to FIG. 10, in a clutched-in position, with wear.

When the friction linings 101 begin to wear, the membrane spring 16a will continue to move toward or in the direction of the arrow P, whereby the free end 32a of the wear detection lever 26a can be positioned with contact at the radial projection 56a and carried along by the radial projection 56a. In FIG. 11, this can lead to a counter-clockwise displacement of the wear detection lever 26a around the axial advance element axis 28a upon release of the friction clutch. The one-way clutch 122 can allow for such a rotation between the wear detection lever 26a and the worm 30a.

When the clutch is subsequently released, the free end 32a of the wear detection lever 26a can be positioned with contact on the membrane spring 16a. The membrane spring 16a can entrain the wear detection lever 26a when the membrane spring 16a displaces in the opposite direction of the arrow P and can thereby cause the wear detection lever 26a to rotate counter-clockwise around the axial advance element axis 28a in FIG. 12. Because of the one-way clutch 122, the worm 30a can be carried along in the displacement of the wear detection lever 26a, and a rotation of the worm 30a around the axial advance element axis 28a can lead to an axial motion of the toothed wheel work 36a of the cutting ring 18a, which combs or meshes with the worm 30a, relative to the axial advance element axis 28a. This can then lead to a rotation of the cutting ring 18a around the clutch axis A and an automatic compensation of the wear tolerance through the sloped surfaces 38a, as previously described above with reference to the first embodiment.

Figure 12:
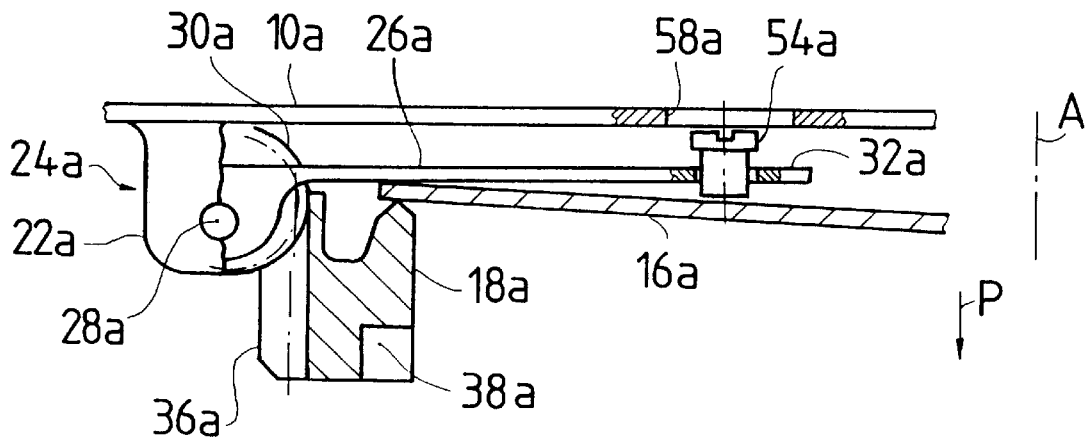
FIG. 12 is a view corresponding to FIG. 9 after wear occurs.

FIG. 12 illustrates, for a possible embodiment of the present invention, the released position of the friction clutch immediately following the engaged position of the friction clutch shown in FIG. 11. However, FIG. 12 illustrates, for a possible embodiment of the present invention, that the pin element 54a can be carried by the lever 26a. The pin element 54a can be attached to the lever 26a by a threaded connection, for example, to permit adjustment of the spacing between the first and second stop along the clutch axis A.

FIGS. 9 to 12 show that an opening 58a can be formed in the housing 10, preferably in the area where the pin element 54a can be attached to the membrane spring 16a. On the one hand, this opening 58a can essentially prevent any interference between the housing 10a and the pin element 54a. On the other hand, the opening 58a can provide access to the pin element 54a when the pressure plate arrangement or the clutch are in assembled condition. If the pin element 54a is arranged to be displaced on the membrane spring 16a in the direction of the clutch axis A by a thread or the like, it can even be possible to screw in the pin element 54a after the clutch has already been assembled; in addition, it is possible to adjust the spacing between the first and the second stop in the direction of the clutch axis A.

In the pressure plate arrangement according to the second embodiment, the adjustment device 24a is preferably radially arranged in an area outside of the membrane spring 16a, which area can be formed on the housing 10. This is an area where a clutch constructed in this manner can provide a relatively large space for the arrangement of components. At essentially the same time, however, the wear experienced at a random radial position, for example of membrane spring 16a, can be detected by providing the wear detection lever 26a. With this type of embodiment, the size or design of the membrane spring is essentially not dependent on the arrangement of the adjustment device 24a. For example, the membrane spring 16a can be designed to be relatively small in diameter to provide for the desired spring force.

In addition, in the embodiment shown in FIGS. 1 to 8, as well as in the embodiment according to the FIGS. 9 to 12, the wear between a component which moves toward or in the direction of or in the direction substantially along the clutch axis A when wear occurs, and a component which cannot be displaced toward or in the direction of or substantially along the clutch axis A when wear occurs, can be detected. This means that the wear detection lever 26 or 26a can detect essentially the precise wear that has actually occurred.

In addition, it can be possible to detect the wear between a component which moves along the clutch axis A when wear occurs, as for example the pressure plate 14, and a component which moves in the opposite direction when wear occurs. When looking at FIG. 2, for example, this can be achieved in that the wear detection lever 26 does not detect the wear in interaction with the spring hanger pin 20, but rather with a segment of the membrane spring 16 which is located radially inside of the spring hanger pin 20. When wear occurs, the membrane spring 16 preferably displaces in such a manner that the membrane spring 16 can move in the direction of the arrow P with the pressure plate 14 with the area located radially outside of the spring hanger pin 20, while the area located radially inside of the spring hanger pin 20 can be displaced in opposite direction to the arrow P. This means that the wear occurring during operation leads to an even larger relative movement between these two components, which enables an easier and more precise detection of the wear that has occurred.

Figure 10A:
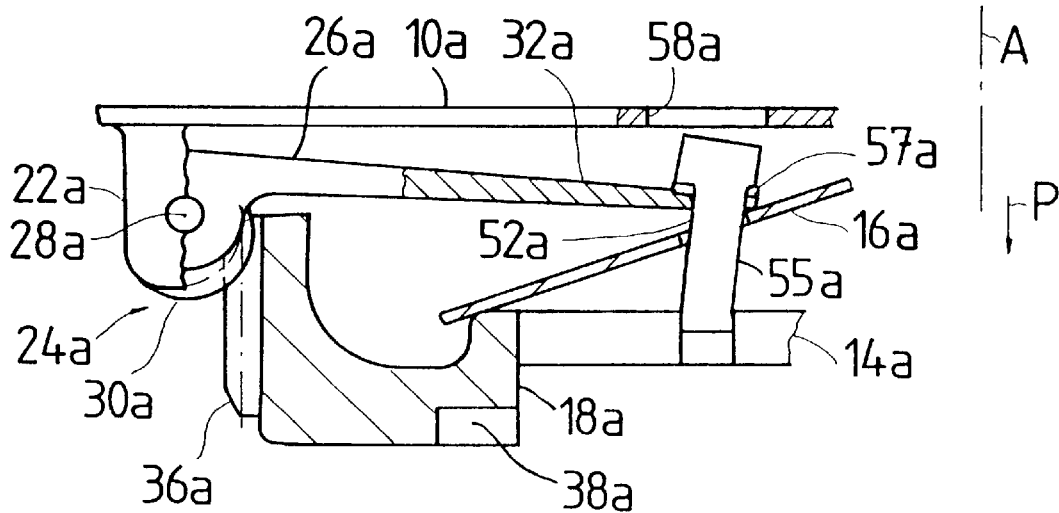
FIG. 10A is an alternative embodiment of the present invention.

FIG. 10A shows another embodiment of the pressure plate arrangement according to the present invention. In this embodiment, the pin element 55a is preferably not attached to the membrane spring 16a, but rather the pin element 55a is preferably attached to the pressure plate 14a. The pin element 55a can extend through a through-opening provided in the membrane spring 16a, and the pin element 55a can also extend through the opening provided in the area of the free end 32a in the wear detection lever 26a. The pin element 55a can again have a radial projection 57a, which radial projection 57a can form the first stop in this embodiment. The second stop can again be formed by the membrane spring 16a. When wear occurs, the pressure plate 14a, as well as the membrane spring 16a, can move toward the flywheel in the direction of the arrow P. The pin element 55a with its radial projection 57a, like the pin element 54a, can move with the pressure plate 14a toward the arrow P. In this way, the radial projection 57a can be positioned with contact at the free end 32a of the wear detection lever 26a and can cause a clockwise displacement of the wear detection lever 26a in FIG. 10A. When the wear detection lever 26a is displaced in this manner, it can rotate relative to the worm 30a because the one-way clutch preferably permits a rotation between these two elements, that is, between the worm 30a and the wear detection lever 26a.

During a subsequent release of the clutch, the radial outer area of the membrane spring 16 can then be displaced back again in the opposite direction of the arrow P, which displacement can again position the free end 32a of the wear detection lever 26a with contact on the membrane spring 16a, and can thus displace the wear detection lever 26a counter-clockwise. Because of the one-way clutch 122, the worm 30a can also be carried along to rotate counter-clockwise in FIG. 10A, which rotation can then lead to a corresponding displacement of the toothed wheel work 36a of the cutting ring 18a in the direction of the axial advance element axis 28a and a corresponding rotation of the cutting ring 18a around the clutch axis A.

A third embodiment of the pressure plate arrangement according to the present invention is described below with reference to FIGS. 13 to 22. Structural components, which correspond to components of the embodiment according to FIGS. 1 to 8, have the same reference symbols with the addition of a "b".

Figure 13:
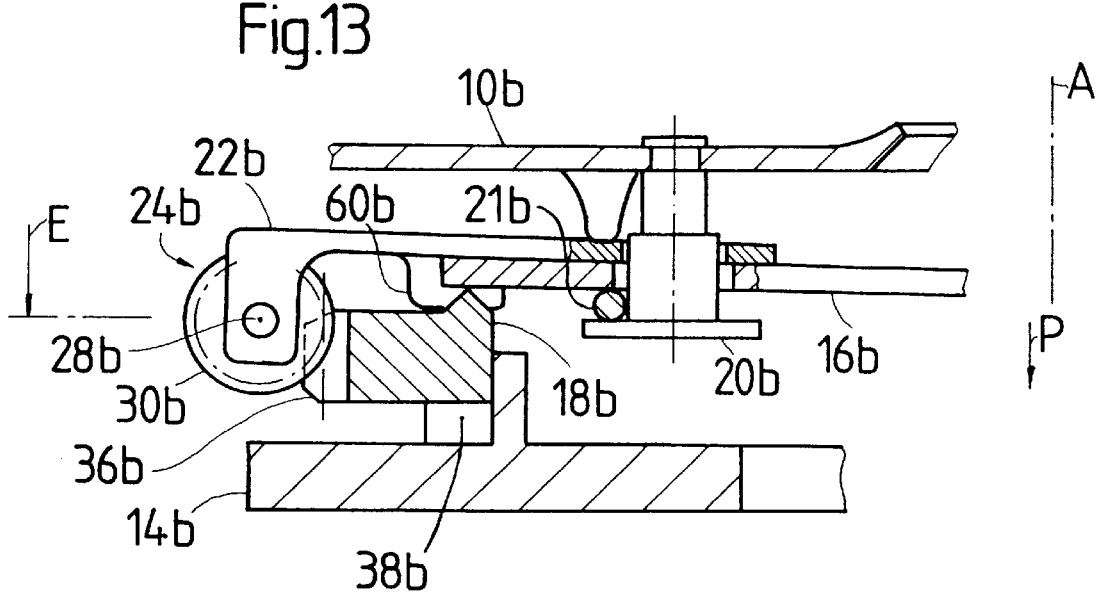
FIG. 13 is a partial longitudinal cross-section view through a pressure plate arrangement according to the invention according to a third embodiment in a released position, without wear.

FIG. 13 shows that the carrier 22b for the worm 30b can be attached in a radial outer area of the membrane spring 16b. For this purpose, a hook-like segment 60b can be provided at the carrier 22b, which segment 60b can enclose the outer circumference area of the membrane spring 16b. In accordance with one embodiment, shown in FIG. 13A, the carrier 22b can furthermore preferably be positioned with contact on the membrane spring 16b by rivets, screws, or the like 116b.

In this embodiment of the present invention, a movement allowance or play or axial play or axial clearance in the direction of the clutch axis A is preferably provided between the worm 30b and the toothed wheel work 36b of the cutting ring 18b, which toothed wheel work or worm gearing 36b can comb or meshingly engage with said worm 30b, to detect and compensate the wear. This movement allowance can be designed preferably in such a manner that it can allow for a relative motion between the worm 30b and the toothed wheel work 36b of the cutting ring 18b during engagement and release without the two (worm 30b and the toothed wheel work 36b) being in a loading position when no wear occurs. The toothed wheel work 36b of the cutting ring 18b can preferably be a spiral gearing which combs or gearingly meshes with a correspondingly slanted worm 30b. It could also be possible, however, that the worm 30b can be designed only as individual slanted worm segments that are essentially cylindrically formed components which rotate around the axial advance element axis 28b on a carrier 22b.

In the embodiment of FIG. 13, the one-way clutch 122 can be designed in such a manner that it preferably acts between the carrier 22b and the worm 30b.

FIG. 13 shows a released position of the pressure plate arrangement where preferably the radial inner segment of the membrane spring 16b is pressed in the direction of the arrow P and the radial outer segment of the membrane spring 16b is displaced with the carrier 22b and the worm 30b in the opposite direction of the arrow P to enable a corresponding movement of the pressure plate 14b with the cutting ring 18b away from the flywheel. This position can correspond to the relative position between the worm 30b and the toothed wheel work 36b at the cutting ring 18b shown in FIG. 17, whereby FIG. 17 represents a cut in the plane E of FIG. 13. Because of the spiral gearing 36b at cutting ring 18b and the corresponding slanted worm 30b, the movement allowance provided between the worm 30b and the toothed wheel work 36b in the direction of the clutch axis A can lead to the play in the direction of the axial advance element axis 28b shown in FIG. 17.

If the clutch is brought or put or placed in an engaged position, the radial outer area of membrane spring 16b can displace in the direction of the arrow P, which displacement can lead to a movement of the worm 30b in the direction of the arrow P relative to the cutting ring 18b or the toothed wheel work 36b, as shown in FIG. 14. However, because the play is provided in the direction of the clutch axis A between the worm 30b and the toothed wheel work 36b, axial advance surfaces 62b of the worm 30b can be moved relative to corresponding counter surfaces 64b of the toothed wheel work 36b at the cutting ring 18b only to the point where there is no transmission of force or load between these two surfaces 62b and 64b (see FIG. 18).

When the friction linings 101 wear during use of the clutch, the pressure plate 14b and the cutting ring 18b can preferably continue to move in the direction of the arrow P, as shown in FIG. 15. Because of the axial advance surfaces 62b of the worm 30b, which surfaces 62b can be positioned with contact at the counter surfaces 64b, load can then be transmitted between these two surfaces 62b and 64b. Because the cutting ring 18b is preferably loaded by the membrane spring 16b in this position and cannot rotate relative to the pressure plate 14b, the worm 30b can rotate around the axial advance element axis 28b in the direction of an arrow D. In this way, the one-way clutch 122 is preferably designed in such a manner that the one-way clutch 122 can allow such a movement of the worm 30b relative to the carrier 22b. This mutual positioning of the surfaces 62b and 64b is shown in FIG. 19.

The alternating effect between the surfaces 62b and 64b which preferably leads to the rotation of the worm 30b around the axial advance element axis 28b, can be additionally enhanced if the toothed wheel work 36b at the cutting ring 18b and/or the worm 30b have a conical form in cross-section, as shown in FIG. 19. The reason for this is shown in FIG. 15: when wear occurs and the carrier 22b and the membrane spring 16b are displaced, the radial outer area of the carrier 22b can be displaced in the direction of an arrow S. However, besides the parallel displacement toward the arrow direction P in the direction of the clutch axis A, this arrow S can also have a component radial to the clutch axis A. This means that the approach between the surfaces 62b and 64b, which approach can occur during wear, can be additionally supported on the one hand by the conical design of the toothed wheel work 36b in cross-section, and on the other hand by the radial component of the displacement S of the carrier 22b.

When such wear has occurred and the clutch is released in a position that corresponds to the position shown in FIG. 16, the worm 30b can be moved in the opposite direction of the arrow P relative to the cutting ring 18b. Because the worm 30b was preferably rotated around the axial advance element axis 28b in the previous engaged position because of wear, the axial advance surfaces 62b which are arranged in an opposite direction are then preferably positioned with contact during the clutch release process on the corresponding counter surfaces 64b' of the toothed wheel work 36b and exert a force in the direction of the axial advance element axis 28b on the toothed wheel work 36b (FIG. 20). However, because the one-way clutch 122 can block the worm 30b from rotating around the axial advance element axis 28b in this position, the worm 30b preferably has no means of evasion and the axial advance surfaces 62b, which are slanted relative to the axial advance element axis 28b, can preferably cause a displacement of the toothed wheel work 36b in the direction of the axial advance element axis 28b, i.e., the cutting ring 18b will rotate around the clutch axis A. Because the slant surfaces 38b, which run around the circumference as shown in FIG. 13, can be provided between the cutting ring 18b and the pressure plate 14b, the rotation of the cutting ring 18b relative to the pressure plate 14b can lead to a corresponding adjustment of the wear tolerance.

The above description illustrates that in the third embodiment of the present invention, the wear can be detected solely because of the movement provided between the worm 30b and the toothed wheel work 36b in the direction of the clutch axis A, i.e., the play between the axial advance surfaces 62b, 62b' and the corresponding counter surfaces 64b and 64b', without providing additional wear sensors or the like. This can lead to a clearly more simplified construction of this pressure plate arrangement, which simplified construction can require fewer components and thus can simplify the assembly.

In other words, for a possible embodiment of the present invention shown in FIGS. 26–30, clearance between the worm 30b and the toothed wheel work or external gearing or worm gear portion 36b of the cutting ring 18b can be used to sense the wear of the friction linings 101 and thereby actuate the wear adjustment device 24b to compensate for wear of the friction linings 101. Structural components in FIGS. 26–30 which correspond to components of the embodiment shown in FIGS. 13–20 have the same reference numerals.

As shown in FIG. 13A, the carrier 22b can be attached or mounted to or carried upon a radially outer portion of the membrane spring 16b. The carrier 22b can be positioned on the outer circumferential area of the membrane spring 16b by the fastening member 116b. The fastening member 116b can be realized, in possible variant embodiments of the present invention, as one or more rivets, screws or bolts, or a combination thereof. In yet other possible embodiments of the present invention, the fastening member 116b can be an adhesive, a weld joint, or a solder joint. In further possible embodiments of the present invention, the carrier 22b can be attached to the membrane spring 16b with a heat-shrink joint or by an interference fit.

As shown in FIG. 13, the worm 30b can be located radially outside of the contact of the membrane spring 16b with the cutting ring 18b. FIG. 13 illustrates a released position of the pressure plate arrangement wherein the friction linings 101 can be considered essentially unworn.

Figure 26:
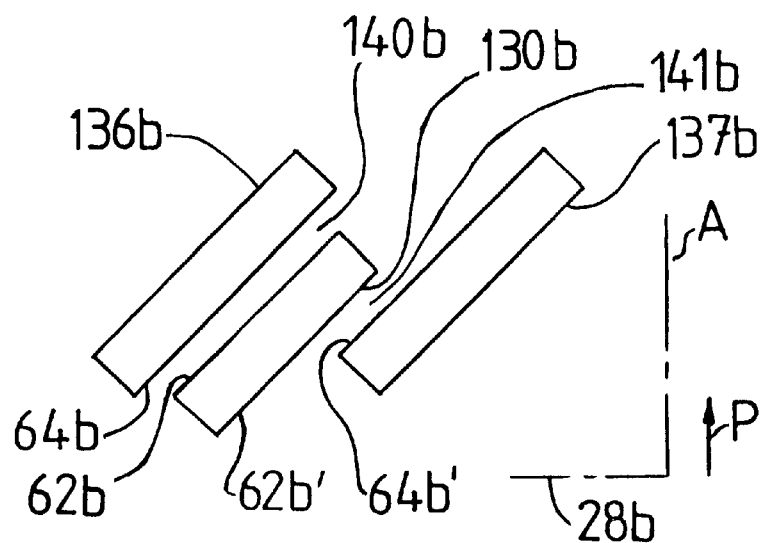
FIGS. 26–29 are schematic partial views of a possible embodiment of the present invention.

The position shown in FIG. 13, for a possible embodiment of the present invention, can correspond to the relative position between the worm 30b and the toothed wheel work 36b at the cutting ring 18b shown schematically in FIG. 26. FIG. 26 illustrates for a possible embodiment the relationship between two adjacent projections 136b and 137b of the toothed wheel work 36b and a portion or "tooth" 130b of the worm 30b. The projections 136b and 137b can be preferably realized as gear teeth 136b and 137b. Although the worm 30b can preferably have a continuous spiral-shaped or helical shaped worm gear portion 128b (see FIG. 13A) extending along the axial extension axis 28b in a known manner, for purposes of illustration the portion of the worm 30b located or active between the teeth 136b and 137b of the toothed wheel work 36b can be considered a single tooth 130b.

The teeth 136b and 137b of the external gearing 36b can be oriented substantially transverse to or slanted with respect to the clutch axis A. The tooth 130b of the worm 30b can be shaped to cooperate with the teeth 136b and 137b in a known manner for the possible transfer of torque between the worm 30b and the cutting ring 18b. As shown in FIG. 26, the worm 30b and the external gearing 36b can be positioned to permit clearance or play or movement allowance 140b and 141b between the teeth 136b and 137b and the tooth 130b substantially in the direction of the clutch axis A when the friction clutch is in the released position with essentially unworn friction linings 101. The tooth 130b of the worm 30b can be oriented substantially transverse to the axial extension axis 28b. The relative positioning of the external gearing 36b with respect to the worm 30b shown in FIG. 26 can correspond to the relative positioning of the external gearing 36b with respect to the worm 30b shown in FIG. 17. The play along the clutch axis A between the toothed wheel work 36b and the portion 130b of the worm 30b can permit detection of wear of the friction linings 101.

To engage the friction clutch, the radial outer area of the membrane spring 16b can displace in the direction of the arrow P. The displacement of the outer area of the membrane spring 16b can correspond to a displacement of the pressure plate 14b in the direction of the arrow P, from the released position of the pressure plate 14b shown in FIG. 13, to an engaged position of the pressure plate 14b shown in FIG. 14. FIG. 14 illustrates, for a possible embodiment of the present invention, an engaged position of the pressure plate arrangement wherein the friction linings 101 can be considered essentially unworn.

Because the worm 30b can be carried on the carrier 22b, which carrier 22b can be attached to the radial outer area of the membrane spring 16b, the worm 30b can also undergo a displacement in the direction of the arrow P when the membrane spring 16b is displaced to engage the friction clutch. However, because the worm 30b is preferably located radially outside of the membrane spring 16b, the corresponding displacement of the worm 30b in the direction of the arrow P can be greater than the corresponding displacement of the pressure plate 14b in the direction of the arrow P when the membrane spring 16b is displaced to engage the friction clutch. Therefore, a relative movement or relative displacement of the worm 30b with respect to the pressure plate 14b can occur in the direction of the arrow P when the friction clutch changes state from the released state shown in FIG. 13 to the engaged state shown in FIG. 14.

Figure 27:
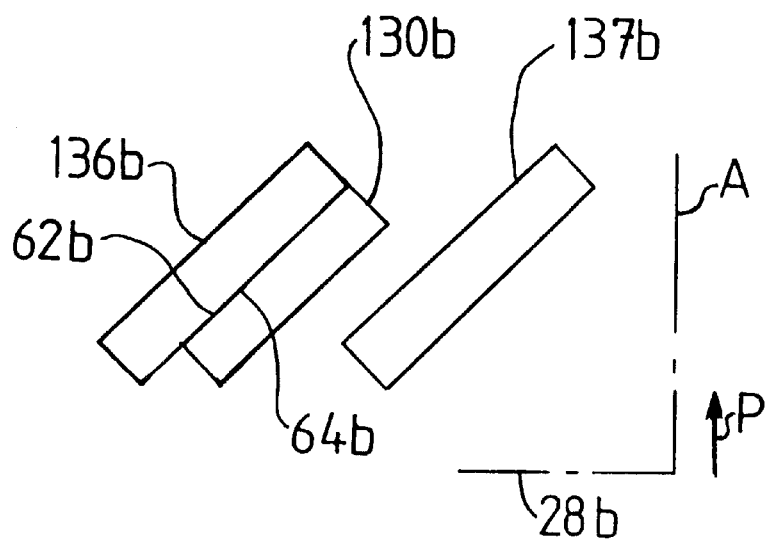

The position shown in FIG. 14 can correspond to the relative position between the worm 30b and the toothed wheel work 36b at the cutting ring 18 shown schematically in FIG. 27 for a possible embodiment of the present invention. Because the worm 30b has moved in the direction of the arrow P with respect to the cutting ring 18b upon engagement of the friction clutch, the tooth 130b of the worm 30a can preferably also move in the direction of the arrow P with respect to the teeth 136b and 137b of the wheel work 36b of the cutting ring 18b. Preferably however, the clearance 140b can be provided such that the axial advance surface 62b of the worm 30b can move immediately adjacent the axial advance surface 64b of the toothed wheel work 36b without substantial transmission of load or force between the two surfaces 62b and 64b. In effect, the initial axial clearance along the clutch axis A can prevent the actuation of the adjustment device 24b when the friction linings 101 are essentially unworn. The relative positioning between the toothed wheel work 36b with respect to the worm 30b shown in FIG. 27 can correspond to the relative positioning between the toothed wheel work 36b with respect to the worm 30b shown in FIG. 18.

As the friction linings 101 wear during use of the friction clutch, the pressure plate 14b and the cutting ring 18b can preferably increase the magnitude of movement in the direction of the arrow P, as shown in FIG. 15. FIG. 15 illustrates, for a possible embodiment of the present invention, the engaged position of the friction clutch wherein the friction linings 101 have worn sufficiently to preferably necessitate actuation of the adjustment device 24b to compensate for wear of the friction linings 101. Wear of the friction linings 101 can permit greater and greater displacement of the pressure plate 14b and the cutting ring 18b in the direction of the arrow P from the released position to the engaged position of the pressure plate arrangement. Therefore, a greater and greater relative displacement of the worm 30b with respect to the pressure plate 14b and cutting ring 18b in the direction of the arrow P can also occur as the friction linings 101 increasingly wear with use of the friction clutch.

Figure 28:
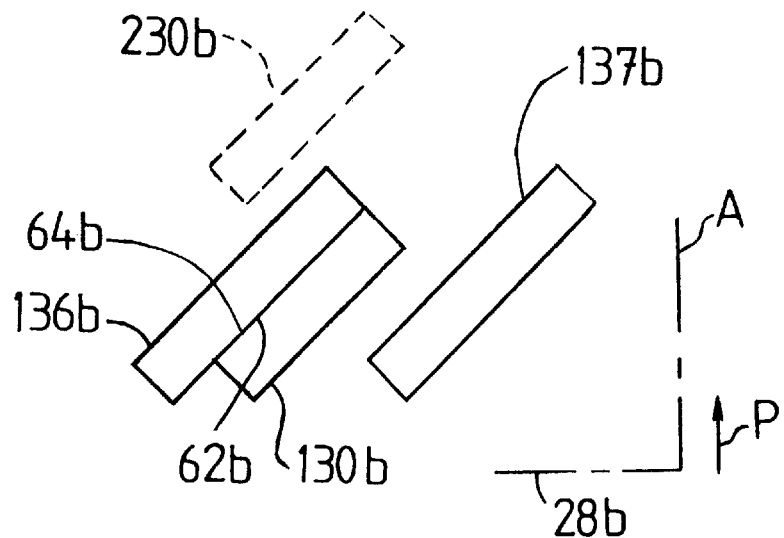

The position shown in FIG. 15 can correspond to the relative position between the worm 30b and the toothed wheel work 36b at the cutting ring 18b shown schematically in FIG. 28 for a possible embodiment of the present invention. Because the worm 30b preferably can attempt to move even farther in the direction of the arrow P with respect to the cutting ring 18b because of wear of the friction linings 101 as compared to the relative displacement between the worm 30b and the cutting ring 18b shown in FIG. 27, the tooth 130b of the worm 30b can attempt to be displaced to the position 230b shown in dotted lines in FIG. 28. However, the axial allowance or clearance along the clutch axis A can preferably be insufficient to prevent interference for this amount of relative axial displacement between the worm 30b and the cutting ring 18b.

As shown in FIG. 28, the axial advance surface 62b of the tooth 130b of worm gear 30b can instead preferably impact the axial advance surface 64b of the tooth 136b of the toothed wheel work 36b, and a torque can be generated acting on each of the worm gear 30b and the cutting ring 18b as a result of this impact. Because the cutting ring 18b is preferably transmitting the spring force from the membrane spring 16b to the pressure plate 14b to engage the pressure plate 14b against the friction linings 101, the impact torque is preferably insufficient to overcome the resulting frictional forces resisting relative rotation between the cutting ring 18b and the pressure plate 14b. Therefore, the cutting ring 18b can be considered as non-rotatably attached to the pressure plate 14b upon impact and can remain stationary with respect to the pressure plate 14b.

Instead, the impact torque can act to rotate the worm gear 30b about the axis 28b; in effect the worm gear 30b can rotate to allow the "tooth" 130b to remain against the tooth 136b even though the worm gear 30b itself can translate or be displaced as the extra distance with respect to the pressure plate 14b in the direction of the arrow P. The rotation of the worm gear 30b can permit the preferably spiral-shaped tooth portion of the worm gear 30b to engage the axial advance surface 62b as the worm gear 30b is displaced in the direction of the arrow P with respect to the pressure plate 14b; the tooth 130b can be considered for illustrative purposes to have "backed up" from the desired final resting position 230b of the tooth 130b illustrated in dashed lines in FIG. 28 to the actual final resting position of the tooth 130b shown in solid lines in FIG. 28 as a result of the rotation of the worm 30b.

Preferably, the one-way clutch 122 can be configured to permit relative rotation of the worm gear 30b with respect to the carrier 22b during the impact of the worm gear 30b with the axial advance surface 62b of the toothed wheel work 36b. The relative positioning between the toothed wheel work 36b with respect to the worm 30b and the rotation of the worm gear 30b shown in FIG. 28 can correspond to the relative positioning between the toothed wheel work 36b with respect to the worm 30b and the rotation of the worm gear 30b shown in FIG. 19.

As shown in FIG. 15 and explained above, the displacement of the worm gear 30 to the engaged position shown in FIG. 15 can include an axial displacement component substantially parallel to the clutch axis A and a radial displacement component substantially transverse to the clutch axis A. Therefore, the teeth 136b and 137b can be configured in a conical configuration corresponding to the conical configuration of the teeth of the toothed wheel work 36b shown in FIG. 19 to support transfer of torque between the worm 30b and the cutting ring 18 caused by the relative radial motion between the worm 30b and the cutting ring 18b.

Upon release of the friction clutch from the engaged position shown in FIG. 15, the radial outer portion of the membrane spring 16b, and therefore the worm 30b carried on the carrier 22b, can each move in the opposite direction of the arrow P as shown in FIG. 16. FIG. 16 illustrates, for a possible embodiment of the present invention, the released position of the friction clutch immediately following the engaged position of the friction clutch shown in FIG. 15. As described previously, the worm 30b was preferably rotated about the axial advance axis 28b as a result of the impact of the worm gear 30b with the cutting ring 18b during the immediately preceding engagement of the friction clutch, the impact being caused by the wear of the friction linings 101. In effect, as illustrated schematically in FIG. 28, the "tooth" 130b was displaced in the opposite direction of the arrow P and towards the membrane spring 16b as a result of that impact. Because of the prior rotation of the worm 30b, the adjustment device 24b can act upon the release of the friction clutch to rotate the cutting ring 18b and compensate for the wear of the friction linings 101.

Figure 29:
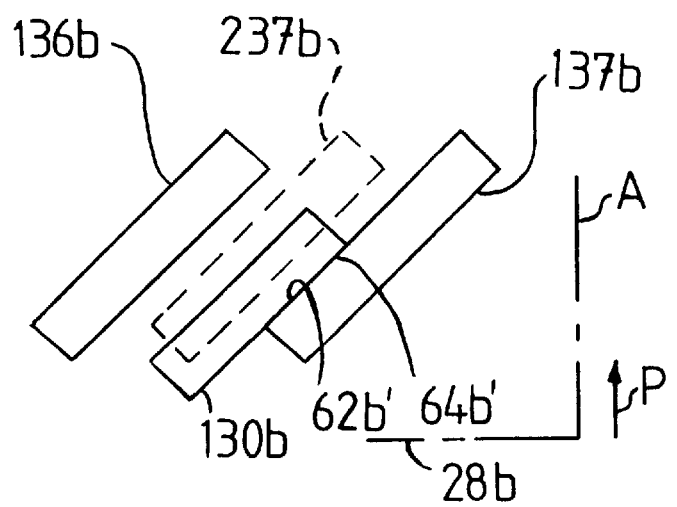

The position shown in FIG. 16 can correspond to the relative positioning between the worm 30b and the toothed wheel work 36b shown schematically in FIG. 29 for a possible embodiment of the present invention. Because of the prior rotation of the worm 30b, the tooth 130b had, in effect, been moved in the opposite direction of the arrow P upon the prior engagement of the friction clutch. When moving from the engaged position to the released position, the worm 30b can move in the direction opposite of the arrow P relative to the pressure plate 14b. The relative motion of the worm 30b with respect to the pressure plate 14b causes the tooth 130b to move towards the tooth 137b of the toothed wheel work 36b. Because of the prior rotation of the worm 30b, the tooth 130b will impact the tooth 137b, with axial advance surface 62b' of the tooth 130b impacting the axial advance surface 64b' of the tooth 137b. The position 237b of the tooth 137b at initial impact is shown in FIG. 29 as dashed lines. This impact can attempt to rotate the worm 30b about the axial advance axis 28b in the direction opposite to the prior rotation of the worm 30b.

However, because the one-way clutch 122 preferably can prevent relative rotation between the worm 30b and the carrier 22b in this opposite direction, the worm 30b can be prevented from rotating upon impact of the axial advance surface 62b' with the axial advance surface 64b'. Because the membrane spring 14b has been moved to the released position, the spring loading on the cutting ring 18b is relatively low. The torque generated by the impact of the worm gear 30b with the tooth 137b of the toothed wheel work 36b can now overcome the friction between the cutting ring 18b and the pressure plate 14b, and the tooth 137b can move with the tooth 130b to the position shown in FIG. 29, thereby rotating the cutting ring 18b with respect to the pressure plate 14b. The relative rotation of the cutting ring 18b can cause an axial extension of the cutting ring 18b with respect to the pressure plate 14b, thereby compensating for the wear of the friction linings 101.

Figure 21:
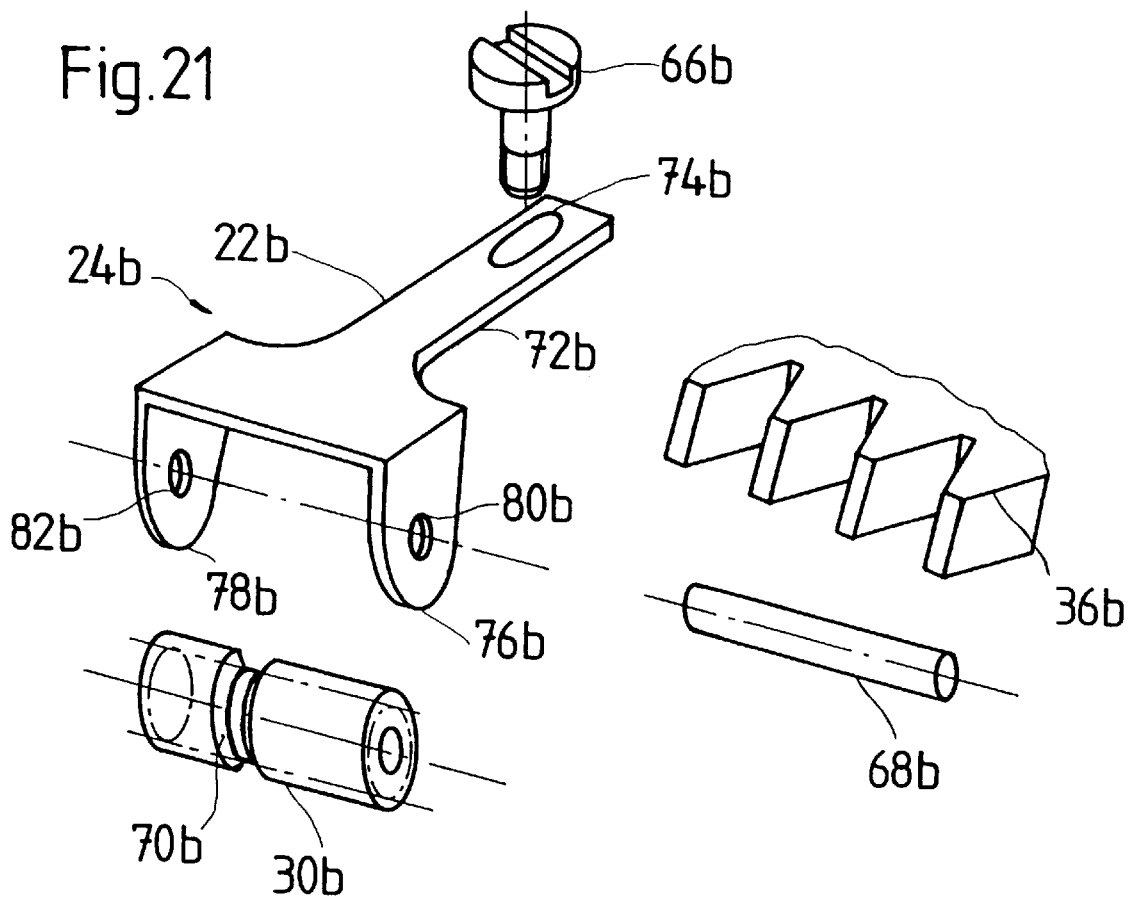
FIG. 21 is an exploded view diagram of the adjustment device of the pressure plate arrangement in FIG. 13.
Figure 22:
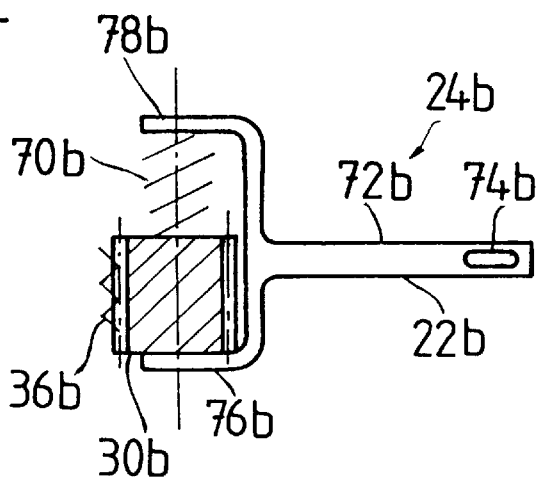
FIG. 22 is another embodiment of an adjustment device.

FIGS. 21 and 22 represent an embodiment of the adjustment device 24b. Here, the carrier 22b can include a fastening segment 72b. The fastening segment 72b can be positioned with contact on the membrane spring 16b, and the fastening segment 72b can have a relatively long hole 74b. A stud or the like 66b can pass through the long hole 74b, which stud 66b can pass through a corresponding opening in the membrane spring 16b to thus fasten the carrier 22b to the membrane spring 16b. Fastened to the fastening segment 72b of the carrier 22b can be two tabs 76b, 78b. The two tabs 76b and 78b can essentially extend substantially perpendicular from the segment 72b and can have corresponding openings 80b, 82b. An axial advance element axis part 68b can be guided through these openings 80b and 82b. The worm 30b can be positioned to rotate on the axial advance element axis part 68b. Also provided is a coil pressure spring 70b, which spring 70b can enclose the axial advance element axis part 68b and can be arranged between the worm 30b on the one hand and the tab 78b on the other hand. Thus, the coil pressure spring 70b can press the worm 30b against the tab 76b.

In a possible embodiment of the present invention, the stud 66b shown in FIG. 21 can correspond to the fastener 116b shown in FIG. 13A.

Because of the friction load acting between the coil pressure spring 70b and the worm 30b, the coil pressure spring 70b preferably allows a rotation of the worm 30b in only one direction around the axial advance element axis part 68b. By interacting with the worm 30b on the one hand and the tab 78b of the carrier 22b on the other hand, the coil pressure spring 70b can form or correspond to the one-way clutch 122 for the worm 30b which has in effect a continuous, i.e. step-less, function. This can allow a relatively extremely precise adjustment of the wear tolerance, because there can be practically no dead travel or play or lost motion of the one-way clutch 122 formed by the coil pressure spring 70b.

In other words, for a possible embodiment, the coil pressure spring 70b can correspond to the one-way clutch 122 shown in FIG. 1A.

Although the one-way clutch 122 formed by the coil pressure spring 70b has been described above with reference to the third embodiment of the pressure plate arrangement according to the invention, it is clear to a person skilled in the art that a corresponding embodiment of a one-way clutch 122 can also be used in the first and second embodiments of the present invention.

The carrier 22b is represented in FIG. 22 in such a manner that the tabs 78b and 76b do not extend substantially perpendicularly away from the fastening segment 72b, as shown in FIG. 21, but rather extend essentially in the same direction as the fastening segment 72b. In this way, the carrier 22b can form an essentially fork-shaped structural component.

In other possible embodiments of the present invention, the one-way clutch 122 can be realized as a ratchet and pawl mechanism. In other possible embodiments of the present invention, the one-way clutch 122 can use a friction spring. In yet other possible embodiments of the present invention, the one-way clutch 122 can be realized as a free-wheeling or overrunning clutch.

Figure 23:
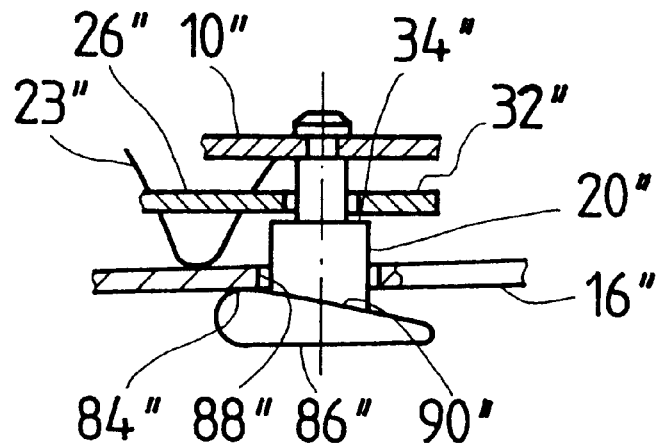
FIG. 23 is a partial cross-section view showing an alternate embodiment of spring hanger pins for the membrane spring.
Figure 24:
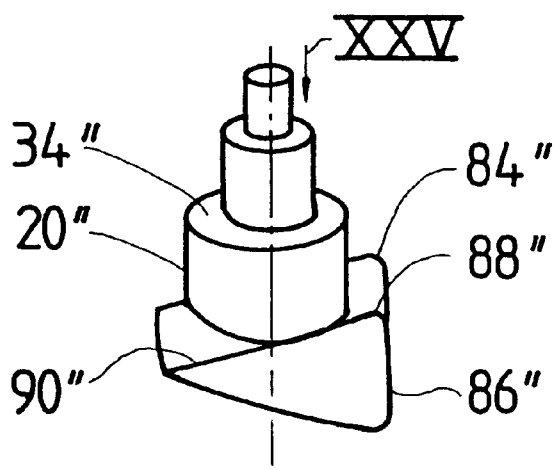
FIG. 24 is a perspective view of a spring hanger pin.
Figure 25:
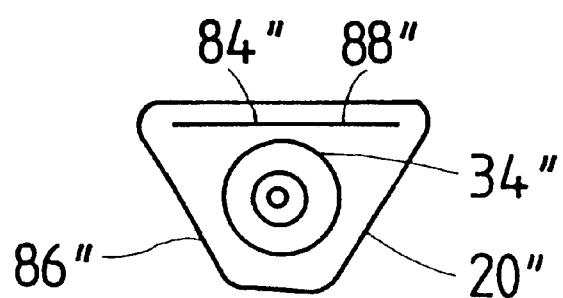
FIG. 25 is a view of a spring hanger pin of FIG. 24 in the direction of an arrow XXV.

FIGS. 23 to 25 show a special embodiment of the spring hanger pins 20 for the membrane spring 16. In this embodiment of the spring hanger pins 20, the provision of a wire ring 21, as is required, for example, in FIG. 1, can be unnecessary. Rather, the spring hanger pin 20 can be designed in such a manner that a cutter 84' is formed by a head 86' of the pin 20', which cutter 84' can support the membrane spring 16', especially during release of the clutch. In the engaged position of the clutch, the projections 23' on the housing 10' can still form a contact area for the membrane spring 16'. Such an embodiment of the spring hanger pins 20' can simplify the construction of the clutch because the wire ring 21 can become essentially obsolete. Thus, one less structural component can be required, and the assembly process can be simplified because the wire ring 21 does not need to be installed during the assembly of the clutch or the pressure plate arrangement. The cutter 84' can be formed especially by a vertex 88 of a slanted surface 90' of the head 86'. Although the use of the spring hanger pin 20 has been with reference to the embodiment of FIG. 1, it goes without saying that a spring hanger pin 20 designed in this manner can also be used in the other embodiments of the pressure plate arrangement according to the invention.

One feature of the invention resides broadly in the pressure plate arrangement for a motor vehicle friction clutch with automatic wear compensation, including: a clutch housing 10b which can be fastened to a flywheel that can turn around a clutch axis A, a pressure plate 14b which is arranged in the clutch housing 10b, can be displaced relative to the clutch housing in the direction of the clutch axis A, and can be supported at the flywheel by the friction linings of a clutch disk, an energy storage device 16b, especially a membrane spring 16b, which is supported with bias or pre-stress or pre-tension or pre-load between a contact area on the clutch housing and a contact area on the pressure plate 14b, wear tolerance adjustment device with at least one wear compensation element 18b to compensate for wear that occurs during operation, and an adjustment device 24b to operate the wear compensation element 18b, whereby the wear compensation element 18b comprises a ring element 18b which rotates around the clutch axis A with a toothed wheel work 36b that is arranged at least on the periphery of the same to compensate for wear, and whereby the adjustment device 24b comprises an axial advance element 30b which is positioned to rotate around an axial advance element axis 28b on a carrier 22b, which axial advance element has on an outer surface at least one axial advance segment 62b which acts with the toothed wheel work 36b on the ring element to generate an axial advance of the toothed wheel work 36b of the ring element 18b in the direction of the axial advance element axis 28b, whereby a one-way clutch 70b is assigned to the axial advance element 30b, which clutch allows for a rotation of the axial advance element 30b in one direction only with respect to the carrier 22b, characterized in that a movement play or allowance is provided between the toothed wheel work 36b on the ring element 18b and the axial advance segment 62b of the axial advance element 30b in the direction of the clutch axis A to detect the wear.

Another feature of the invention resides broadly in the pressure plate arrangement characterized in that the energy storage device 16b is a membrane spring 16b and that the carrier 22b is arranged on the membrane spring 16b.

Yet another feature of the invention resides broadly in the pressure plate arrangement characterized in that the toothed wheel work 36b on the ring element 18b is a spiral or helical gearing 36b which is arranged in an outer periphery of said ring element.

Still another feature of the invention resides broadly in the pressure plate arrangement characterized in that the axial advance segment 62b has an axial advance surface 62b which runs slanted or sloped with respect to the axial advance element axis 28b.

A further feature of the invention resides broadly in the pressure plate arrangement characterized in that the axial advance segment 62b is formed by at least one worm drive or gearing or gear which is formed at an outer circumference surface of the axial advance element 30b.

Another feature of the invention resides broadly in the pressure plate arrangement characterized in that the movement play between the axial advance element 30b and the toothed wheel work 30b is calculated in such a way on the ring element 18b that the axial advance element 30b can be moved in a predetermined motion range in the direction of the clutch axis A with respect to the ring element 18b without generating a corresponding force effect between the axial advance segment 30b and the toothed wheel work 36b on the ring element 18b.

Yet another feature of the invention resides broadly in the pressure plate arrangement characterized in that the predetermined motion range is a motion range of the axial advance element 30b with respect to the ring element 18b in the direction of the clutch axis A, in which range the axial advance element 30b can be moved in an engagement or release of the motor vehicle friction clutch with respect to the ring element 18b in a position where no wear has occurred.

Still another feature of the invention resides broadly in the pressure plate arrangement characterized in that in case of wear when the motor vehicle friction clutch is engaged, a relative movement occurs between the axial advance element 30b and the ring element 18b in the direction of the clutch axis A with simultaneous force effect of the ring element 18b on the axial advance element 30b, and that the one-way clutch 70b then allows a rotation of the axial advance element 30b around the axial advance element axis 28b.

A further feature of the invention resides broadly in the pressure plate arrangement characterized in that in a subsequent disengagement process, the axial advance element 30b can at first be freely rotated around the predetermined motion range with respect to the ring element 18b in the direction of the clutch axis A, and that after passing the predetermined motion range, a torque of the axial advance element 30b acts on the ring element 18b, whereby the one-way clutch 70b prevents the axial advance element 30b from rotating around the axial advance element axis 28b, in order to generate an axial advance of the toothed wheel work 36b of the ring element 186 which combs with the axial advance element 30b, into the direction of the axial advance element axis 28b.

Another feature of the invention resides broadly in the pressure plate arrangement for a motor vehicle friction clutch with automatic wear compensation, including: a clutch housing 10; 10a which can be attached or affixed or fastened to a flywheel 12 that can be turned around a clutch axis A, a pressure plate 14; 14a which is arranged in the clutch housing 10; 10a and can be displaced relative to said clutch housing in the direction of the clutch axis A and is supported at the flywheel 12 by the friction linings of a clutch disk, a membrane spring 16; 16a which is supported with bias or pre-stress or pre-tension between a contact area 23 of the clutch housing 10; 10a and a contact area 18; 18a of the pressure plate 14; 14a, wear tolerance adjustment means with at least one wear compensation element 18; 18a to compensate for a wear that occurs during operation, and an adjustment device 24; 24a to operate the wear compensation element 18; 18a, whereby the wear compensation element 18; 18a comprises a ring element 18; 18a which rotates around the clutch axis A with a toothed wheel work 36; 36a that is arranged at least on the periphery of the same to compensate for wear, and whereby the adjustment device 24; 24a comprises an axial advance element 30; 30a which is positioned to rotate around an axial advance element axis 28; 28a on a carrier 22; 22a, which axial advance element has on an outer surface at least one axial advance segment which acts with the toothed wheel work 36; 36a on the ring element 18; 18a to generate an axial advance of the toothed wheel work 36; 36a of the ring element 18; 18a in the direction of the axial advance element axis 28; 28a, whereby the carrier is arranged with the axial advance element 30; 30a in radial direction outside of an outer periphery area of the membrane spring 16; 16a, characterized in that a wear detection lever 26; 26a is also pivotally moved around the axial advance element axis 28; 28a at the carrier 22; 22a, which wear detection lever 26; 26a is coupled with the axial advance element 30; 30a through a one-way clutch, and that a free end 32; 32a of the wear detection lever 26; 26a can be positioned with contact at a first or a second stop spaced in the direction of the clutch axis A to detect and compensate for wear.

Yet another feature of the invention resides broadly in the pressure plate arrangement characterized in that the carrier 22 is arranged at the pressure plate 14.

Still another feature of the invention resides broadly in the pressure plate arrangement characterized in that the membrane spring 16 is carried on the housing 10 by a multiple of spring hanger pins 20, and that the free end 32 of the wear detection lever 26 extends between a bearing shoulder 34 formed on at least one of the spring hanger pins 20 and the housing 10.

A further feature of the invention resides broadly in the pressure plate arrangement characterized in that the shoulder of the stop 34 forms the first stop at the spring hanger pin 20.

Another feature of the invention resides broadly in the pressure plate arrangement characterized in that the housing 10 forms the second stop.

Yet another feature of the invention resides broadly in the pressure plate arrangement characterized in that a long hole or elongated hole or oblong hole or slot is formed in the area of the free end 32 of the wear detection lever 26 and that the hole presses through or encloses a portion of the spring hanger pin 20.

Still another feature of the invention resides broadly in the pressure plate arrangement characterized in that the free end 32 of the wear detection lever 26 is bent away from the housing 10.

A further feature of the invention resides broadly in the pressure plate arrangement characterized in that the first and/or second stop 48 can be adapted to adjust the space between the first and the second stop in the direction of the clutch axis and/or to adjust the position of the first and/or second stop 48 with respect to the free end 32 of the wear detection lever 26.

Another feature of the invention resides broadly in the pressure plate arrangement characterized in that the first and/or the second stop 48 is formed by the tapering end segment 48 of a pin element 46 which pin element is attached essentially perpendicular on the housing 10 in the direction of the clutch axis A and is displaceable.

Yet another feature of the invention resides broadly in the pressure plate arrangement characterized in that the first and/or the second stop 42, 44 is formed integrally with the housing 10.

Still another feature of the invention resides broadly in the pressure plate arrangement characterized in that the carrier 22a is arranged on the housing 10a.

A further feature of the invention resides broadly in the pressure plate arrangement characterized in that a pin element 54a with a radial projection 56a is arranged on the membrane spring 16a, and that the free end 32a of the wear detection lever 26a extends between the radial projection 56a at the pin element 54a and the membrane spring 16a.

Another feature of the invention resides broadly in the pressure plate arrangement characterized in that the radial projection 56a forms the first stop at the pin element 54a.

Yet another feature of the invention resides broadly in the pressure plate arrangement characterized in that the membrane spring 16a forms the second stop.

Still another feature of the invention resides broadly in the pressure plate arrangement characterized in that a long hole 52a is formed in the area of the free end 32a of the wear detection lever 26a, through which long hole the pin element 54a passes.

A further feature of the invention resides broadly in the pressure plate arrangement characterized in that the pin element 54a is attached to the membrane spring 16a between the first stop and the second stop and can be displaced in the direction of the clutch axis A to adjust the spacing.

Another feature of the invention resides broadly in the pressure plate characterized in that a pin element 55a is arranged at the pressure plate 14a, which pin element extends through an opening in the membrane spring 16a in the direction of the clutch axis A, and that the free end 32a of the wear detection lever 26a extends between a radial projection 57a formed at the pin element 55a and the membrane spring 16a and forms the second stop.

Yet another feature of the invention resides broadly in the pressure plate arrangement characterized in that the toothed wheel work 36; 36a on the ring element 18; 18a is a spiral gearing 36; 36a arranged on the periphery of said ring element.

Still another feature of the invention resides broadly in the pressure plate assembly characterized in that the axial advance segment has an axial advance surface that is sloped with respect to the axial advance element axis 28; 28a.

A further feature of the invention resides broadly in the pressure plate arrangement characterized in that the axial advance segment is formed by at least one worm segment which is formed at an outer circumference surface of the axial advance element 30a.

Another feature of the invention resides broadly in the pressure plate arrangement for a motor vehicle friction clutch with automatic wear compensation, including: a clutch housing 10 which can be fastened to a flywheel 12 that can be turned around a clutch axis A, a pressure plate 14 which is arranged in the clutch housing 10 and can be displaced relative to said clutch housing in the direction of the clutch axis A and is supported at the flywheel 12 by the friction linings of a clutch disk, an energy storage device 16, especially a membrane spring, which is supported with bias or pre-stress or pre-tension between a contact area 23 of the clutch housing 10 and a contact area 18 of the pressure plate 14, wear tolerance adjustment means with at least one wear compensation element 18 to compensate for wear that occurs during operation, and an adjustment device 14 to operate the wear compensation element 18, whereby the wear compensation element 18 comprises a ring element 18 which can rotate around the clutch axis A and has on its periphery at least one toothed wheel work 36 to compensate for wear, and whereby the adjustment device 24 comprises an axial advance element 30 which is positioned to rotate around an axial advance element axis 28 on a carrier 22, which axial advance element has on an outer surface at least one axial advance segment which acts with the toothed wheel work 36 on the ring element 18 to generate an axial advance of the toothed wheel work 36 of the ring element 18 in the direction of the axial advance element axis 28, also comprising wear detection means 26 to detect the wear and generate a corresponding wear adjustment with the at least one wear compensation element 18 characterized in that the wear detection means 26 detects the wear between the pressure plate 14 and a structural component 20 that is non-displaceable relative to the clutch housing 10 at the when wear occurs.

Yet another feature of the invention resides broadly in the pressure plate arrangement characterized in that the wear detection means 26 comprises a wear detection lever 26 which is pivotally moved around the axial advance element axis 28 and is coupled with the axial advance element 30 through a one-way clutch, and that a free end 32 of the wear detection lever 26 can be positioned with contact at a first or second stop 10, 34 to detect and compensate for wear, whereby the first and the second stop 10, 34 are spaced relative to each other in the direction of the clutch axis A and are stationary with respect to the clutch housing 10.

Still another feature of the invention resides broadly in the pressure plate arrangement characterized in that the wear detection means detects the wear between the pressure plate and a structural component that cannot be displaced in the direction of the pressure plate when wear occurs.

Other examples of clutch components which may be incorporated into embodiments of the present invention, or which components could be adapted for use in the context of the present invention, could be disclosed by the following U.S. Pat. Nos.: 5,509,518, 5,450,934, 5,409,091, 5,404,979 and 5,320,205.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 196 25 107.9, filed on Jun. 24, 1996, having inventors Andreas Orlamünder and Matthias Fischer, and DE-OS 196 25 107.9 and DE-PS 196 25 107.9, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle having automatic compensation for wear, said friction clutch comprising:

a clutch housing;

said clutch housing being configured to rotate about a longitudinal axis of said friction clutch;

a pressure plate being disposed within said clutch housing;

said pressure plate being configured and disposed to engage and release at least one friction lining of a clutch disc with a flywheel of the motor vehicle;

said pressure plate being configured and disposed to be axially movable along the longitudinal axis;

a membrane spring being disposed between said clutch housing and said pressure plate;

said membrane spring being configured and disposed to bias said pressure plate;

a device to compensate for wear of the at least one friction lining of the clutch disc;

said wear compensation device comprising at least one element to compensate for wear;

said at least one wear compensation element being disposed to rotate about the longitudinal axis with respect to said pressure plate to compensate for wear;

said wear compensation device comprising an actuator to rotate said at least one element to compensate for wear;

said wear compensation actuator comprising a lever to actuate said wear compensation actuator;

said lever being pivotable about a pivoting axis to actuate said wear compensation actuator;

a first stop being disposed to detect wear;

a second stop being disposed to actuate said wear compensation actuator upon detection of wear;

said lever being disposed between said first stop and said second stop;

said first stop being disposed to contact said lever to pivot said lever upon wear;

said second stop being disposed to contact said lever to pivot said lever and actuate said wear compensation actuator;

said first and second stops being spaced longitudinally apart from one another;

said wear compensation actuator comprising an element to rotate said at least one wear compensation element;

said wear compensation actuator element having an axis of rotation;

said wear compensation actuator element being disposed with its axis of rotation substantially transverse to the longitudinal axis of said friction clutch;

said lever being disposed to pivot about the axis of rotation of said wear compensation actuator element;

said lever being disposed to be pivotable in a first direction of pivoting and an opposite second direction of pivoting;

said wear compensation actuator comprising a one-way clutch;

said one-way clutch being disposed between said lever and said wear compensation actuator element;

said one-way clutch being configured and disposed to permit relative rotation of said lever with respect to said wear compensation actuator element in the first direction of pivoting of said lever, and to limit relative rotation of said lever with respect to said wear compensation actuator element in the second direction of pivoting of said lever about the axis of rotation of said wear compensation actuator element;

said lever having a longitudinal axis;

said lever comprising a first end portion and an axially opposite second end portion;

said first end portion of said lever being connected to said one-way clutch;

said second end portion of said lever being disposed between said first and second stops;

said at least one wear compensation element comprising a plurality of teeth;

each one of said plurality of teeth of said at least one wear compensation element being disposed substantially transverse to the longitudinal axis of said friction clutch;

said wear compensation actuator element comprising an inner portion disposed towards the axis of rotation of said wear compensation actuator element;

said wear compensation actuator element comprising an outer portion disposed away from the axis of rotation of said wear compensation actuator element;

said outer portion of said wear compensation actuator element comprising at least one worm segment;

said at least one worm segment comprising a surface;

said surface of said at least one worm segment being disposed substantially transverse to the axis of rotation of said wear compensation actuator element;

said wear compensation actuator comprising a carrier;

said wear compensation actuator element being rotatably carried by said carrier;

said carrier being attached to said clutch housing;

said friction clutch comprising a pin;

said pin having a longitudinal axis;

said pin comprising a projection portion;

said projection portion of said pin extending radially outward from the remainder of said pin with respect to the longitudinal axis of said pin;

said first stop comprising said pin projection portion;

said second stop comprising said membrane spring;

said friction clutch comprising one of the following sets of characteristics A) and B):
  A) said pin being fastened to said membrane spring; and
    said second end portion of said lever being disposed between said pin projection portion and said membrane spring; and
  B) said pin being fastened to said pressure plate;
    said membrane spring comprising an opening disposed therethrough;
    said pin extending from said pressure plate through said membrane spring opening substantially in the direction of the longitudal axis of said friction clutch; and
    said second end portion of said lever being disposed between said pin projection portion and said membrane spring.

2. The friction clutch according to claim 1, wherein the set of characteristics A) further comprises the set of characteristics:

said membrane spring comprises a first side and an opposite second side;

said first side of said membrane spring is disposed to face said pressure plate;

said second side of said membrane spring is disposed to face said clutch housing;

said second stop comprises said second side of said membrane spring;

said pin comprises a first end portion and a longitudinally opposite second end portion;

said first end portion of said pin is attached to said membrane spring;

said second end portion of said pin comprises said projection portion of said pin;

said second end portion of said pin is disposed between said membrane spring and said clutch housing;

said second end portion of said lever comprises a slot disposed therethrough; and said slot of said second end portion of said lever extends a substantial distance along the longitudinal axis of said lever to permit relative motion between said lever and said pin.

3. The friction clutch according to claim 2, wherein:

said clutch housing is configured to be fastened to the flywheel of the motor vehicle to rotate therewith;

said pin is configured and disposed to be movable along its longitudinal axis to permit adjustment of the axial spacing between said first and second stops;

said at least one wear compensation element comprises an inner portion disposed towards the longitudinal axis of said friction clutch;

said at least one wear compensation element comprises an outer portion disposed away from the longitudinal axis of said friction clutch;

said plurality of teeth of said at least one wear compensation element is disposed on said outer portion of said at least one wear compensation element; and said plurality of teeth of said at least one wear compensation element are configured and disposed to comprise a spiral gearing of said at least one wear compensation element.

* * * * *

UNITED STATES PATENT AND TRADEMARK OFFICE
CERTIFICATE OF CORRECTION

PATENT NO. : 5,927,457

DATED : July 27, 1999

INVENTOR(S) : Andreas ORLAMÜNDER and Matthias FISCHER

Page 1 of 2

It is certified that error appears in the above-indentified patent and that said Letters Patent is hereby corrected as shown below:

In column 1, line 37, after 'to', delete "venerate" and insert --generate--.

In column 25, line 4, after 'cutter', delete " 84' " and insert --84"--.

In column 25, line 5, after 'head', delete " 86' " and insert --86"--.

In column 25, line 5, after 'pin', delete "20'," and insert --20",--.

In column 25, line 5, after 'cutter', delete " 84' " and insert --84"--.

In column 25, line 6, after 'spring', delete "16'," and insert --16",--.

In column 25, line 7, after 'projections', delete " 23' " and insert --23"--.

In column 25, line 8, after 'housing', delete " 10' " and insert --10"--.

UNITED STATES PATENT AND TRADEMARK OFFICE
CERTIFICATE OF CORRECTION

PATENT NO. : 5,927,457
DATED : July 27, 1999
INVENTOR(S) : Andreas ORLAMÜNDER and Matthias FISCHER It is certified that error appears in the above-indentified patent and that said Letters Patent is hereby corrected as shown below:

In column 25, line 9, after the first occurrence of 'spring', delete "16'." and insert --16"--.

In column 25, line 10, after 'pins', delete " 20' " and insert --20"--.

In column 25, line 14, after 'cutter', delete " 84' " and insert --84"--.

In column 25, line 15, after 'surface', delete " 90' " and insert --90"--.

In column 25, line 16, before 'Although', delete "86'." and insert --86"--.

Signed and Sealed this

Sixteenth Day of May, 2000

Q. TODD DICKINSON

*Attest:*

*Attesting Officer*     *Director of Patents and Trademarks*